United States Patent
Somasundaram et al.

(10) Patent No.: US 10,969,959 B2
(45) Date of Patent: Apr. 6, 2021

(54) EFFECTIVE RESYNCHRONIZATION IN VIRTUAL STORAGE AREA NETWORK USING DYNAMIC PARTITIONING AND DATA DEDUPLICATION TECHNIQUES

(71) Applicant: VMware, Inc., Palo Alto, CA (US)

(72) Inventors: Vijay Somasundaram, Mountain View, CA (US); Sudarshan Madenur Sridhara, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 135 days.

(21) Appl. No.: 16/213,698

(22) Filed: Dec. 7, 2018

(65) Prior Publication Data

US 2020/0183584 A1 Jun. 11, 2020

(51) Int. Cl.
  *G06F 16/00* (2019.01)
  *G06F 3/06* (2006.01)
(52) U.S. Cl.
  CPC ............ *G06F 3/0604* (2013.01); *G06F 3/067* (2013.01); *G06F 3/0652* (2013.01)
(58) Field of Classification Search
  CPC ....... G06F 3/0604; G06F 3/0652; G06F 3/067
  See application file for complete search history.

(56) References Cited

U.S. PATENT DOCUMENTS

| | | | |
|---|---|---|---|
| 9,229,657 B1* | 1/2016 | Rus ....................... | G06F 3/0643 |
| 2015/0281345 A1* | 10/2015 | Kobayashi .......... | H04L 67/1008 709/226 |
| 2017/0329546 A1* | 11/2017 | Chen ................... | G06F 11/3034 |

* cited by examiner

*Primary Examiner* — Khanh B Pham
(74) *Attorney, Agent, or Firm* — Fish & Richardson P.C.

(57) ABSTRACT

Techniques for redistributing a virtual storage area network (vSAN) data component in a distributed-computing system are provided. In one embodiment, a method includes storing a data component in a plurality of storage nodes associated with the cluster of storage nodes. The method further includes identifying, within the data component, one or more subcomponents to be redistributed and identifying a set of target storage nodes. The method further includes obtaining one or more data structures representing the one or more subcomponents to be redistributed; and determining, among the set of target storage nodes, one or more destination storage nodes. The method further includes redistributing, in accordance with data storage policy, the one or more subcomponents from one or more source storage nodes to the one or more destination storage nodes.

23 Claims, 13 Drawing Sheets

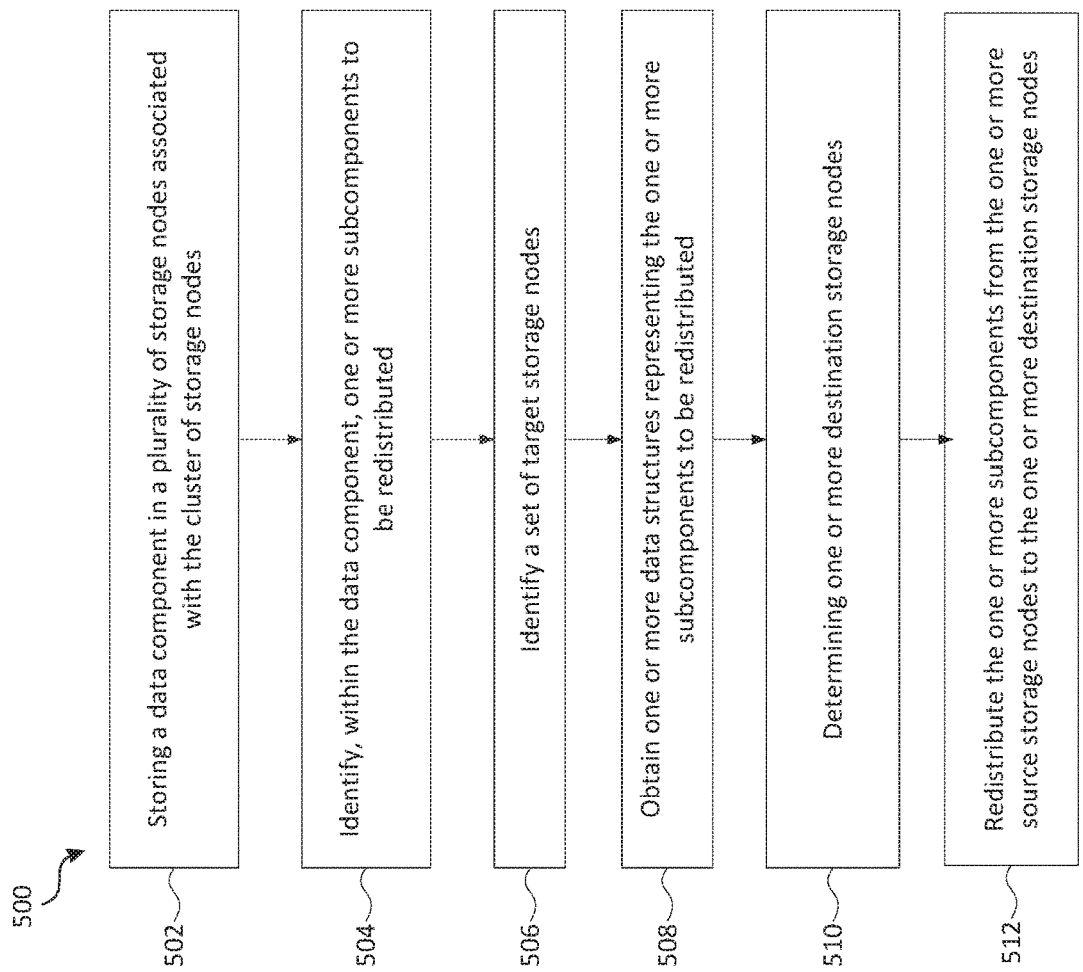

US 10,969,959 B2

EFFECTIVE RESYNCHRONIZATION IN VIRTUAL STORAGE AREA NETWORK USING DYNAMIC PARTITIONING AND DATA DEDUPLICATION TECHNIQUES

FIELD

The present disclosure relates generally to virtual storage area network (vSAN) in a distributed-computing system and, more specifically, to redistributing a vSAN data component in the distributed-computing system using dynamic partitioning and data deduplication techniques.

BACKGROUND

Modern distributed-computing systems are increasingly complex and can include thousands of host computing devices, virtual machines (VMs) and networking components, servicing an increasing number of clients. Distributed-computing systems produce massive volumes of machine-generated data (e.g., application logs, network traces, configuration files, messages, performance data, system state dumps, etc.). These data can provide valuable information to system administrators to help manage these complex systems. For example, these data can be useful in troubleshooting, discovering trends, detecting security problems, and measuring performance.

The massive amount of data produced by the distributed-computing systems can be stored using virtual storage area network (vSAN) techniques. vSAN techniques relate to logical partitioning of a physical storage area network. In particular, a vSAN divides and allocates a portion of or an entire physical storage area network into one or more logical storage area networks, thereby enabling the user to build a virtual storage pool. Currently in vSAN, resynchronization of data is one of the operations that consume a large amount of computing resources, such as CPU time and network bandwidth. For example, based on a fault tolerance policy, a data component may have several duplicates or mirrored copies stored in different storage nodes in a cluster of a vSAN, with each of the storage nodes corresponding to a separate fault domain for providing data redundancy. Storage node failure or load balancing often triggers resynchronization of one or more duplicates of the data component from one storage node to another. Data resynchronization may thus be a common or frequent operation in vSAN. A data component can often include a large amount of data (e.g., in gigabytes or terabytes). Thus, physically moving one or more of the duplicates of the data component each time may consume significant computing resources, such as network bandwidth and CPU time. Thus, there is a need for increasing the efficiency of resynchronizing data in vSAN.

Overview

Described herein are techniques for redistributing a virtual storage area network (vSAN) data component in a distributed-computing system. In one embodiment, a method is performed at one or more storage nodes of a cluster of storage nodes operating in the distributed-computing system. Each storage node can have one or more processors and memory. The method includes storing, in accordance with a data storage policy, a data component in a plurality of storage nodes associated with the cluster of storage nodes. The method further includes identifying, within the data component, one or more subcomponents to be redistributed and identifying a set of target storage nodes. The one or more subcomponents are stored in one or more source storage nodes. The method further includes obtaining one or more data structures representing the one or more subcomponents to be redistributed; and determining, among the set of target storage nodes, one or more destination storage nodes based on the one or more data structures representing the one or more subcomponents to be redistributed. The method further includes redistributing, in accordance with the data storage policy, the one or more subcomponents from the one or more source storage nodes to the one or more destination storage nodes.

In one embodiment, a non-transitory computer-readable storage medium storing one or more programs configured to be executed by one or more processors is provided. The one or more programs stored by the non-transitory computer-readable storage medium include instructions for redistributing a virtual storage area network (vSAN) data component in a distributed-computing system. The instructions include storing, in accordance with a data storage policy, a data component in a plurality of storage nodes associated with the cluster of storage nodes. The instructions further include identifying, within the data component, one or more subcomponents to be redistributed and identifying a set of target storage nodes. The one or more subcomponents are stored in one or more source storage nodes. The instructions further include obtaining one or more data structures representing the one or more subcomponents to be redistributed; and determining, among the set of target storage nodes, one or more destination storage nodes based on the one or more data structures representing the one or more subcomponents to be redistributed. The instructions further include redistributing, in accordance with the data storage policy, the one or more subcomponents from the one or more source storage nodes to the one or more destination storage nodes.

In one embodiment, a system for redistributing a virtual storage area network (vSAN) data component in a distributed-computing system includes one or more processors and memory storing one or more programs configured to be executed by the one or more processors. The one or more programs include instructions for storing, in accordance with a data storage policy, a data component in a plurality of storage nodes associated with the cluster of storage nodes. The instructions further include identifying, within the data component, one or more subcomponents to be redistributed and identifying a set of target storage nodes. The one or more subcomponents are stored in one or more source storage nodes. The instructions further include obtaining one or more data structures representing the one or more subcomponents to be redistributed; and determining, among the set of target storage nodes, one or more destination storage nodes based on the one or more data structures representing the one or more subcomponents to be redistributed. The instructions further include redistributing, in accordance with the data storage policy, the one or more subcomponents from the one or more source storage nodes to the one or more destination storage nodes.

BRIEF DESCRIPTION OF THE DRAWINGS

FIGS. 5A-5B illustrate flowcharts of exemplary processes for redistributing a virtual storage area network (vSAN) data component in a distributed-computing system, in accordance with some embodiments.

DETAILED DESCRIPTION

Figure 1B:
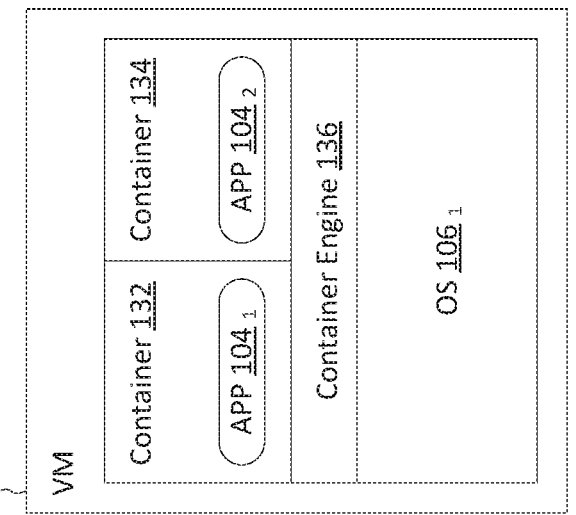
FIG. 1B is a block diagram illustrating a containerized application framework for implementing various components of a distributed-computing system, in accordance with some embodiments.

In the following description of embodiments, reference is made to the accompanying drawings in which are shown by way of illustration specific embodiments that can be practiced. It is to be understood that other embodiments can be used and structural changes can be made without departing from the scope of the various embodiments.

Traditional data storage and resynchronization techniques often store an entire data component in a single storage node. If the storage node fails or reaches its capacity, the entire data component is moved to another storage node. By storing the entire data component in a single storage node, traditional data storage techniques are rigid. Moreover, data resynchronization of the data component typically requires consuming significant computing resources, leading to increased operations and power usage. The dynamic partitioning techniques described in this application divide a data component to multiple subcomponents that can be distributed to and stored in multiple storage nodes, while still complying with a data storage policy (e.g., a fault tolerance policy) for each subcomponent. As a result, data operation for a large data component can also be distributed to multiple storage nodes instead of a single storage node. Thus, the dynamic partitioning techniques enhance load balancing among storage nodes while complying with the data storage policy. This improves the data storage flexibility and efficiency.

This application also describes data deduplication techniques that remove duplicate data blocks or store only unique data blocks in a particular storage node. The data deduplication techniques can improve storage utilization. The data deduplication techniques can also be applied to network data migrations to reduce the number of bytes that must be physically moved (e.g., transferred across storage nodes in a load balancing operation). As described in more detail below, the dynamic partitioning techniques and data deduplication techniques described in this application can provide a more efficient redistribution of data from one storage node to another based on data structures (e.g., hash maps) of subcomponents of a data component.

In particular, by redistributing data using the techniques described in this application, subcomponents of a data component are transmitted or migrated after determining a destination storage node that has the highest data deduplication level for a particular subcomponent. The determination of the destination storage node uses data structures such as hash maps, the size of which is significantly less than the size of the corresponding subcomponents of a data component. As a result, the redistribution of the data described in this application reduces bandwidth and computing resources requirements for data migration operations such as repairing and rebalancing. Moreover, instead of redistributing all subcomponents of a data component from a source storage node to a single destination storage node, the redistribution techniques described below can redistribute different subcomponents of a data component to different storage nodes, depending on the data deduplication level at each destination storage nodes.

Figure 1A:
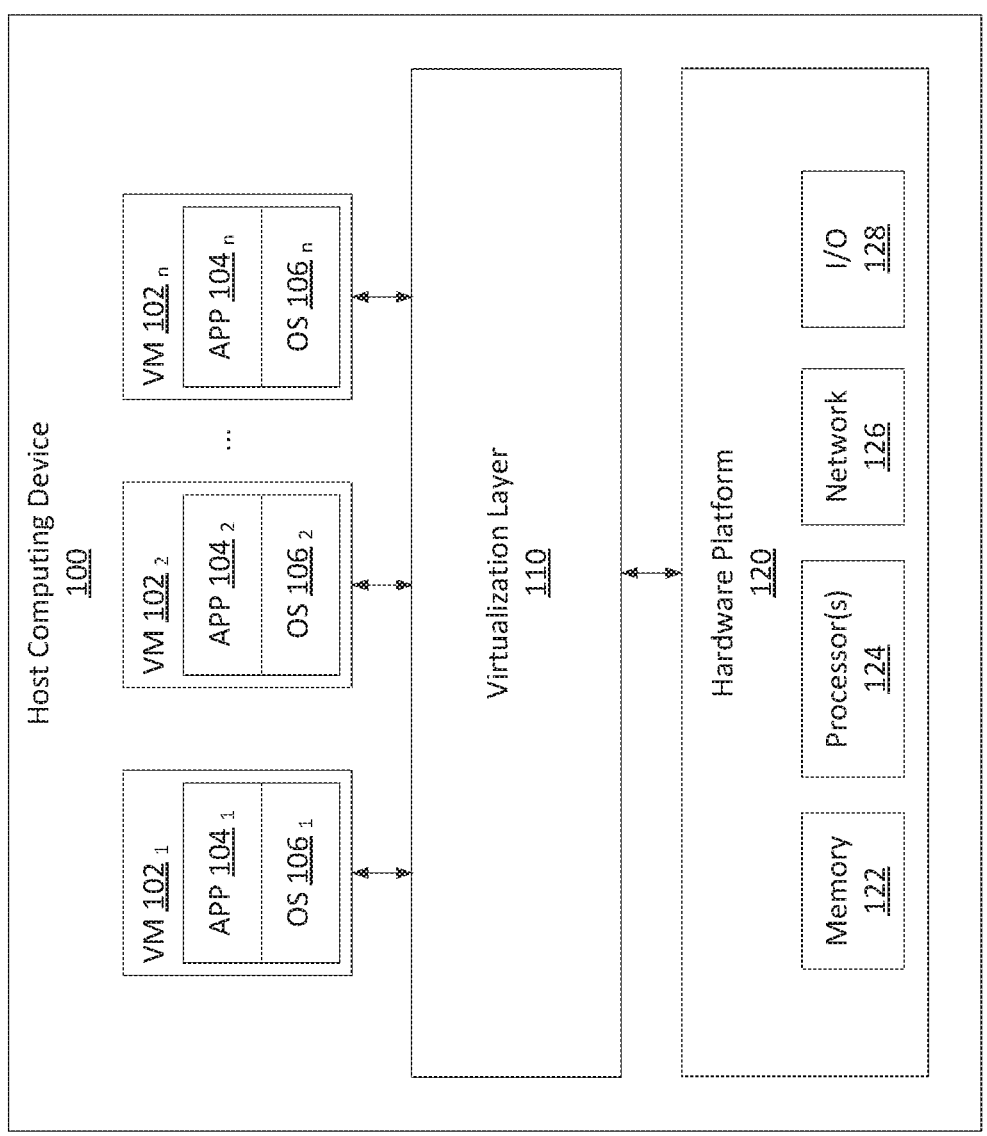
FIG. 1A is a block diagram illustrating a system and environment for implementing various components of a distributed-computing system, in accordance with some embodiments.

FIG. 1A is a block diagram illustrating a system and environment for implementing various components of a distributed-computing system, according to some embodiments. As shown in FIG. 1, virtual machines (VMs) $102_1$, $102_2 \ldots 120_n$ are instantiated on host computing device 100. In some embodiments, host computing device 100 implements one or more elements of a distributed-computing system (e.g., storage nodes of a vSAN 200 described with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

FIG. 1B is a block diagram illustrating a containerized application framework for implementing various components of a distributed-computing system, in accordance with some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (i.e., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system). In some embodiments, a container (e.g., container 132 or 134) can include a gateway application or process, as well as all the dependencies, libraries, binaries, and configuration files needed to run the gateway applications.

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
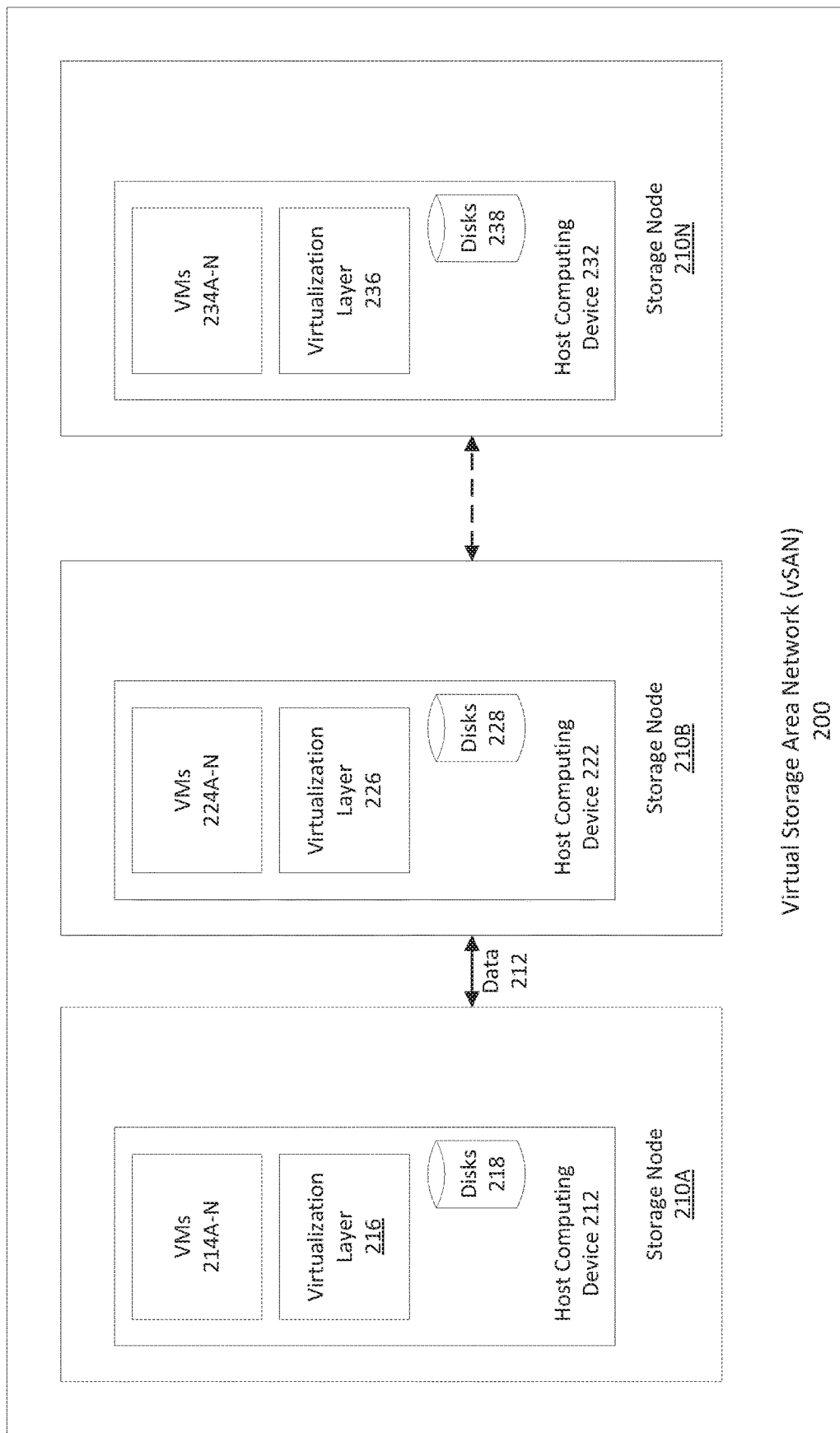
FIG. 2 is a block diagram illustrating a virtual storage area network (vSAN), in accordance with some embodiments.

FIG. 2 is a block diagram illustrating a virtual storage area network (vSAN) 200, in accordance with some embodiments. As described above, a vSAN is a logical partitioning of a physical storage area network. A vSAN divides and allocates a portion of or an entire physical storage area network into one or more logical storage area networks, thereby enabling the user to build a virtual storage pool. As illustrated in FIG. 2, vSAN 200 can include a cluster of storage nodes 210A-N, which can be an exemplary virtual storage pool. In some embodiments, each node of the cluster of storage nodes 210A-N can include a host computing device. FIG. 2 illustrates that storage node 210A includes a host computing device 212; storage node 210B includes a host computing device 222; and so forth. In some embodiments, the host computing devices (e.g., devices 212, 222, 232) can be implemented using host computing device 100 described above. For example, as shown in FIG. 2, similar to those described above, host computing device 212 operating in storage node 210A can include a virtualization layer 216 and one or more virtual machines 214A-N (collectively as VMs 214). In addition, host computing device 212 can also include one or more disks 218 (e.g., physical disks) or disk groups. In some embodiments, VM 214 can have access to one or more physical disks 218 or disk groups via virtualization layer 216 (e.g., a hypervisor). In the description of this application, a storage node is sometimes also referred to as a host computing device.

As illustrated in FIG. 2, data can be communicated among storage nodes 210A-N in vSAN 200. One or more storage nodes 210A-N can also be logically grouped or partitioned to form one or more virtual storage pools such as clusters of storage nodes. The grouping or partitioning of the storage nodes can be based on pre-configured data storage policies such as fault tolerance policies. For example, a fault tolerance policy (e.g., a redundant array of independent disks policy or a RAID policy) may require that multiple duplicates of a same data component be stored in different storage nodes (e.g., nodes 210A and 210B) such that data would not be lost because of a failure of one storage node containing one duplicate of the data component. Such a policy thus provides fault tolerance using data redundancy. In the above example, each duplicate of the entire data component can be stored in one storage node (e.g., node 210A or node 210B). As described in more detail below, in some embodiments, multiple subcomponents of a data component or duplicates thereof can be stored in multiple storage nodes using dynamic partitioning techniques, while still in compliance with the fault tolerance policy to provide data redundancy and fault tolerance. For example, a particular data component may have a size that is greater than the storage capacity of a single storage node (e.g., 256 Gb). Using the dynamic partitioning techniques, the data component can be divided to multiple smaller subcomponents and stored in multiple storage nodes. A data structure (e.g., a hash map) for the subcomponents is determined and maintained for efficient data resynchronization. It should be appreciated that multiple data components can be stored in a storage node. And data structures for the subcomponents of the multiple data components can also be determined and maintained for efficient data resynchronization.

Figure 3A:
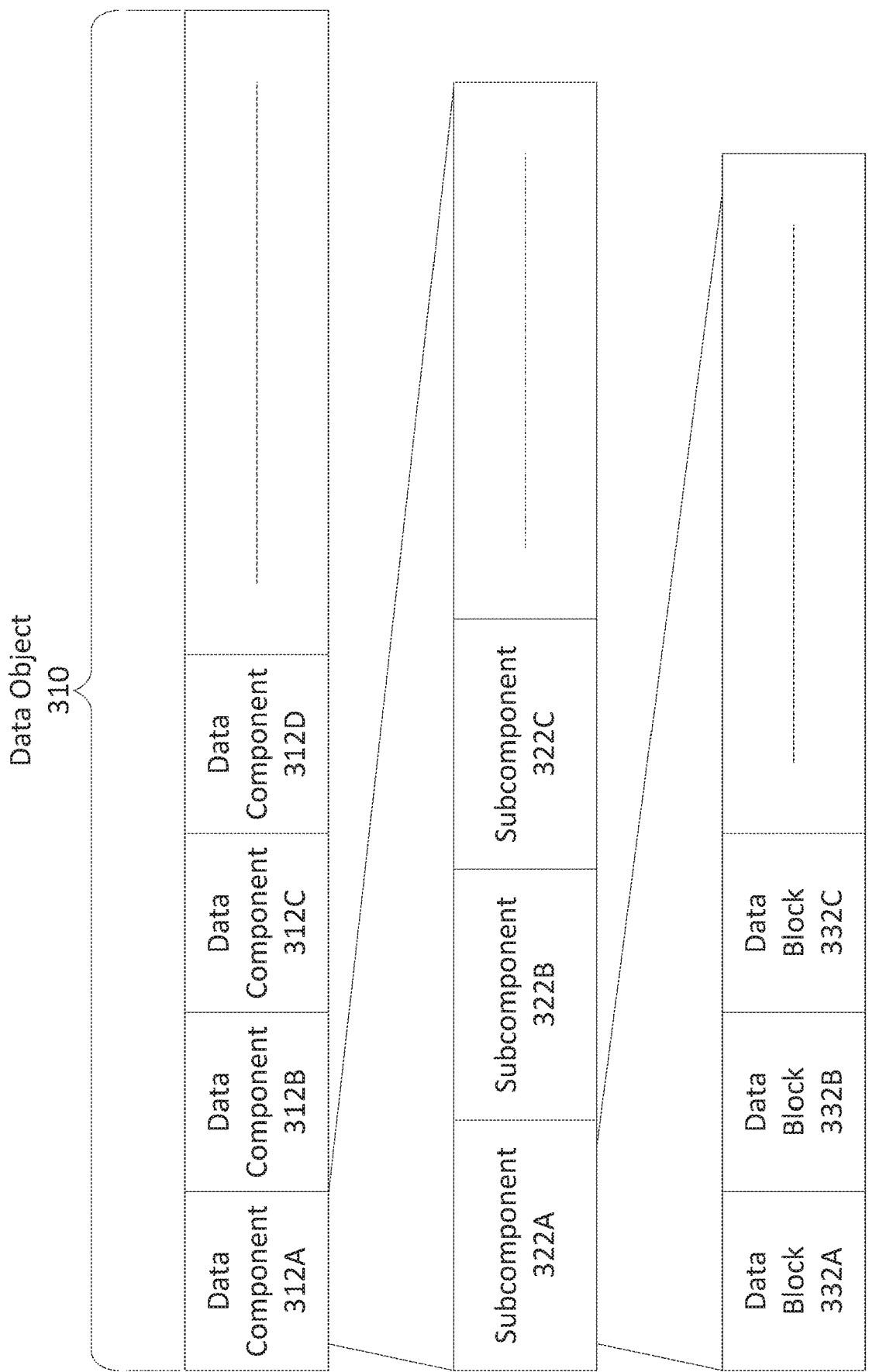
FIG. 3A is a block diagram illustrating the structure of a data object that includes one or more data components, in accordance with some embodiments.

In vSAN, one or more data components can be represented by a data object, which is managed by one or more object managers operating in vSAN. FIG. 3A is a block diagram illustrating the structure of a data object 310 that represents one or more data components, in accordance with some embodiments. Data object 310 can be a vSAN object managed by an object manager (e.g., a distributed object manager or DOM) operating in a storage node. The object manager that manages a data object is described in detail below. In some embodiments, data object 310 can be an address space such as a space allocated in a virtual disk or a virtual storage pool. As described above, a virtual disk or a virtual storage pool corresponds to one or more physical disks of one or more storage nodes in a cluster of storage nodes. Thus, data components represented by data object 310 (e.g., an address space) can be stored in a distributed manner in one or more storage nodes in the cluster of storage nodes.

As illustrated in FIG. 3A, in some embodiments, data represented by data object 310 can be divided to and stored as one or more data components 312A, 312B, 312C, 312D, and so forth (collectively as data components 312). Each data component can represent data that are logically stored together (e.g., a file, a group of files, data that belongs to a same user, etc.). Moreover, data components can have same or different data sizes. As an example, all data components 312 can have a data size of about 128 Gb. As another example, data component 312A may have a data size of about 256 Gb; data component 312B may have a data size of 128 Gb; data component 312C may have a data size of 200 Gb; and so forth.

In some embodiments, a data component can be further divided to and stored as one or more subcomponents. For example, with reference to FIG. 3A, data component 312A can be divided to and stored as subcomponents 322A, 322B, 322C, and so forth (collectively as subcomponents 322). Each subcomponent can have a data size that is less than the data size of its corresponding data component. For example, data component 312A may have a data size of 256 Gb and each of subcomponents 322 may have a data size of 4 Mb. As described below, based on the dynamic partitioning techniques, dividing data of a data component to smaller subcomponents enables the distribution of data in a large data component to multiple storage nodes, while still complying with a data storage policy (e.g., a fault tolerance policy) for each subcomponent. As a result, read/write operation of the data in the large data component can be distributed to multiple storage nodes instead of a single storage node. Thus, the dynamic partitioning techniques that store subcomponents in multiple storage nodes enhance load balancing among storage nodes, while still complying with the data storage policy. As further described below, using subcomponents that have a smaller data size also facilitates a more effective redistribution of data from one storage node to another based on data structures (e.g., hash maps) of the subcomponents.

With reference to FIG. 3A, in some embodiments, each subcomponent can be further divided to and stored as multiple data blocks. For example, subcomponent 322A can be divided to and stored as data blocks 332A, 332B, 332C, and so forth (collectively as data blocks 332). Each data block can have a data size that is less than the data size of its corresponding subcomponent. For example, subcomponent 322A can have a data size of 4 Mb and each of data blocks 332 can have a data size of 4 Kb. As further described below, in some embodiments, a hash entry is generated for each data block and a hash map containing multiple hash entries is generated for each subcomponent. The hash map can be multi-casted to a plurality of target storage nodes for a more effective redistribution of data from one storage node to another. While the exemplary subcomponent and data block used in this application have data sizes of 4 Mb and 4 Kb, respectively, it should be appreciated that the subcomponents and the data blocks can have any desired data sizes.

Figure 3B:
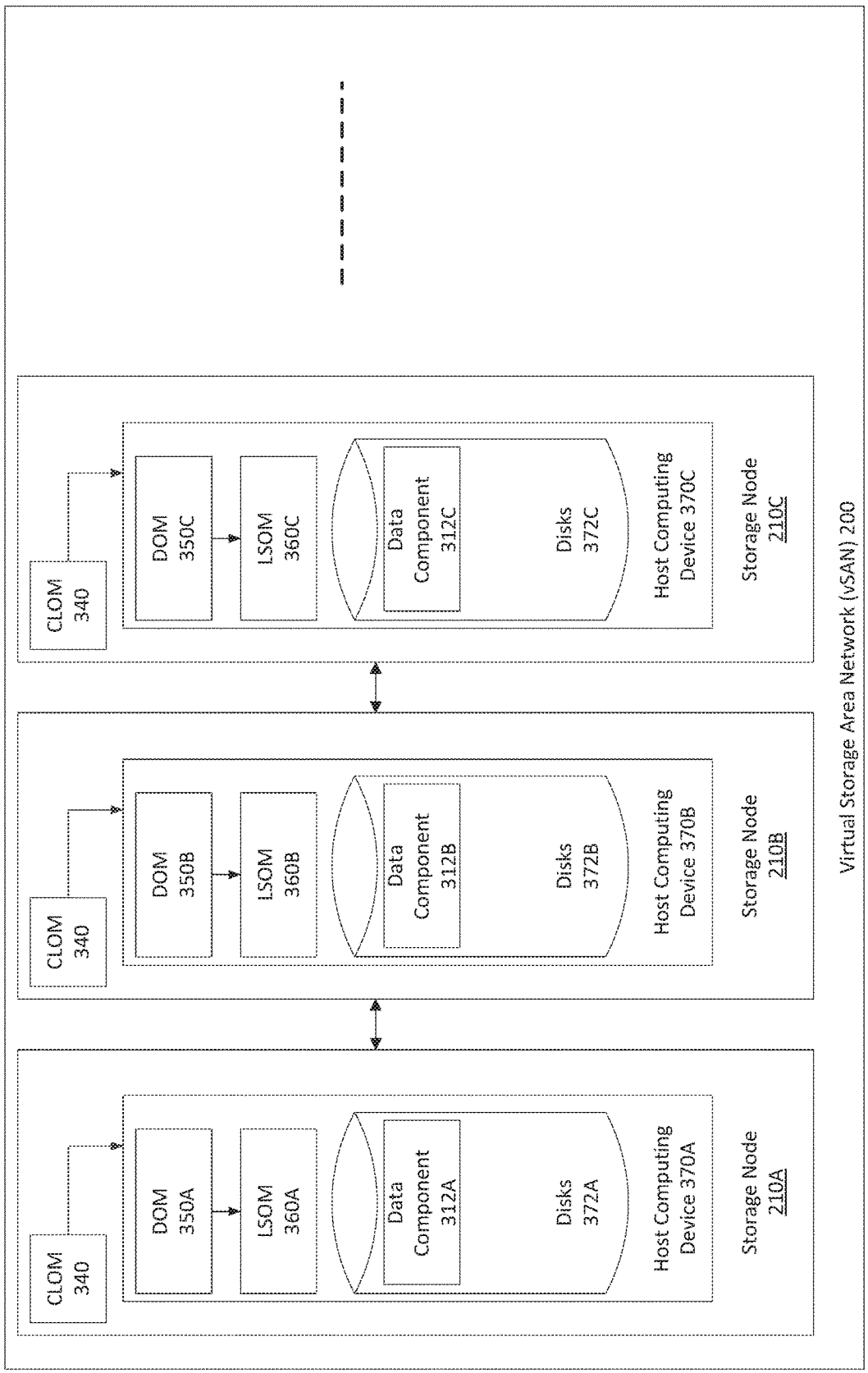
FIG. 3B is a block diagram illustrating a vSAN storing one or more data components in different storage nodes, in accordance with some embodiments.

FIG. 3B is a block diagram illustrating a vSAN 200 storing one or more data components in different storage nodes, in accordance with some embodiments. As described above, a data object can be an address space representing multiple data components (e.g., data components 312A-C). For example, as illustrated in FIGS. 3A and 3B, data represented by a data object 310 can be divided to and stored as a plurality of data components including data components 312A-C. Each of data components 312A-C can have the same or different data size (e.g., a data size of 128 Gb).

In some embodiments, as illustrated in FIG. 3B, a plurality of data components represented by a data object can be stored in a plurality of storage nodes according to a pre-configured data storage policy. For example, as illustrated in FIG. 3B, in some embodiments, vSAN 200 can include a cluster of storage nodes including, for example, storage nodes 210A-C. As described above, storage nodes 210A-C can include host computing devices 370A-C, respectively. Host computing devices 370A-C can be implemented the same as or similar to host computing device 100 described above (e.g., implemented using ESXi hosts).

With reference to FIG. 3B, in some embodiments, vSAN 200 can include one or more cluster-level object managers (CLOMs), one or more distributed object managers (DOMs), and one or more local log structured object managers (LSOMs). These object managers can be processes generated by software components for managing a virtual storage area network such as vSAN 200. As illustrated in FIG. 3B, in some embodiments, a cluster-level object manager (CLOM) can be a process instantiated for managing data objects (e.g., providing data placement configurations for data object placements, resynchronization, rebalancing) for all storage nodes in a particular cluster of storage nodes. For example, a CLOM 340 can be instantiated at storage node 210A (e.g., instantiated in the hypervisor of host computing device 370A) of a cluster to manage data objects for all storage nodes in the cluster, which may include storage nodes 210A-C. Likewise, CLOM 340 can be instantiated at storage nodes 210B or 210C to manage data object for all storage nodes of the cluster of storage nodes. In some embodiments as shown in FIG. 3B, if storage nodes 210A-210C are nodes of a same cluster, one instance of CLOM 340 may be instantiated to manage all the storage nodes of the same cluster.

A CLOM manages all storage nodes in a cluster and therefore can have an overall view of the data storage of the cluster of storage nodes. For example, CLOM 340 can manage all data objects representing data components 312A-C stored in storage nodes 210A-C. As described above, a data object can be an address space allocated in a virtual disk or a virtual storage pool. CLOM 340 can manage the address space allocation of all data objects in the cluster of storage nodes (e.g., nodes 210A-C). For example, for each data object, CLOM 340 can determine and store the corresponding data storage policies such as fault tolerance policies. As described above, data represented by a data object (e.g., the address space) can be divided to and stored as multiple data components. A fault tolerance policy (e.g., a RAID 5 policy) may require that multiple duplicates of a data component be stored in different storage nodes (e.g., node 210A-C) to provide data redundancy, such that data would not be lost because of the failure of one storage node. A fault tolerance policy requiring data redundancy can also require that after new data is added to or removed from a duplicate of a data component, the same operation (e.g., add or remove) is performed with respect to all other duplicates of the same data component. Data redundancy and fault tolerance are described in more detail below.

In some embodiments, CLOM 340 can determine and store data storage policies such as load balancing policies. A load balancing policy can define, for example, load balancing operations (e.g., creation or migration of new data components represented by data objects) among the storage nodes in a cluster, such that data are distributed more evenly among the storage nodes. For example, based on a load balancing policy, if it is determined that the size of the data stored in a particular storage node exceeds a threshold size, at least a portion of a data component stored in the particular storage node can be migrated to different storage nodes.

In some embodiments, CLOM 340 can determine data storage policies based on user inputs, system configurations, system capabilities (e.g., available storage resources), or the like. For example, a fault tolerance policy can be determined based on the data redundancy requirements specifying fault tolerance levels (e.g., RAID 0, 1, 2, 3, 4, 5, 6). A load balancing policy can be determined based on the capacity of each storage node in a cluster. In some embodiments, based on the data storage policies and the system capabilities, CLOM 340 can determine whether a particular data object can be generated and whether the data components represented by the data object can be stored in one or more storage nodes of the cluster in compliance with the data storage policies. For example, if a fault tolerance policy of a particular data object requires the RAID 1 level fault tolerance (e.g., 1 duplicate for each data block in the data components represented by the data object), CLOM 340 can determine whether the particular data object can be generated (e.g., address space allocated). CLOM 340 can further determine whether the corresponding data components can be stored using the existing available storage nodes. In addition, the data components represented by a data object may be altered from time to time. For example, new data may be added to a data component; existing data may be removed from a data component; and/or data may be edited in a data component. CLOM 340 can also determine whether a data object representing the altered data components are still in compliance with the data storage policies. If not, CLOM 340 can instruct one or more distributed object managers (DOMs) to resynchronize the data components (e.g., add or remove data in all duplicates of a data component) such that the data object representing the altered data components is brought in compliance with the data storage policy.

As described above, a data object can be address spaces representing multiple data components (e.g., data components 312A-C may be represented by a data object). In some embodiments, as illustrated in FIG. 3B, CLOM 340 determines that multiple data components represented by a data object are to be stored in different storage nodes based on data storage policies and/or storage nodes capabilities. Based on such a determination, CLOM 340 can instruct one or more DOMs 350A-C to perform the operation with respect to the data components represented by the data object. A DOM can be a process instantiated at a particular storage node for managing data objects (e.g., processing Input/Output or I/O requests or synchronization requests) associated with that particular storage node. In some examples, one instance of a DOM can be instantiated in each storage node. A DOM instance can operate in, for example, a kernel space or a hypervisor of host computing device of a storage node. Multiple DOM instances operating in different storage nodes can also communicate with one another. As shown in FIG. 3B, DOMs 350A-C are instantiated and operate in storage nodes 210A-C, respectively, for managing the data objects representing data components stored on the corresponding nodes. In some embodiments, to perform operations for managing data objects, each of DOMs 350A-C can receive instructions from CLOM 340 and other DOMs operating in other storage nodes of a cluster. For example, for data resynchronization or rebalancing, CLOM 340 can generate new or updated data placement configurations. CLOM 340 can provide the new or updated data placement configurations to one or more of DOMs 350A-C. Based on the new or updated data placement configurations, one or more of DOMs 350A-C can perform a data resynchronization operation and/or a data rebalancing operation. In some embodiments, a DOM 350 can perform operations for managing data objects without receiving instructions from CLOM 340. For example, if data component 312A is not in compliance with the data storage policy for less than a predetermined period of time (e.g., data component 312A is offline momentarily), DOM 350A can perform a data resynchronization operation with respect to data component 312A without receiving instructions from CLOM 340.

In some embodiments, each storage node can have one or more DOM owners and one or more DOM clients. DOM owners and DOM clients are instances of a DOM. Each data object can be associated with one DOM owner and one or more DOM clients. In some embodiments, operations with respect to a data object is performed by a DOM. Thus, a data object is sometimes also referred to as a DOM object. A DOM owner associated with a particular data object receives and processes all I/O requests with respect to the particular data object. A DOM owner can perform the I/O operations with respect to the particular data object according to I/O operation requests received from a DOM client for the particular data object. For example, as shown in FIGS. 3A and 3B, data components 312A-C can be components represented by a same data object 310. DOM 350A can be the DOM owner of data object 310. An I/O operation request with respect to data component 312A may be received at a DOM client from an I/O component of a virtual machine. The I/O operation request may be forwarded from the DOM client to DOM 350A (the DOM owner of data component 312A). DOM 350A can further provide the I/O operation request to a DOM component manager to process the request to perform the I/O operation with respect to data component 312A stored in storage node 210A (e.g., processes the request and instructs LSOM 360A to perform the I/O operation with respect to data component 312A). In some embodiments, if I/O operations are performed with respect to a particular data component, other data components (e.g., duplicates of particular data component) can be synchronized with respect to the data alterations caused by the I/O operations.

FIG. 3B further illustrates one or more local log structured object managers (LSOMs) 360A-C. An LSOM can be a process instantiated at a particular storage node for performing data operations with respect to the data components stored on a particular storage node. As described above, a DOM can obtain instructions, requests, and/or policies from a CLOM and perform operations with respect to data objects, which are address spaces representing data components (e.g., data components 312A-C) of physical data. An LSOM performs operations with respect to these data components of physical data. Thus, data components (and their subcomponents) of a particular storage node are managed by the LSOM operating in the particular storage node.

In some examples, one instance of an LSOM can be instantiated in each storage node. An LSOM instance can operate in, for example, a kernel space or a hypervisor of host computing device of the storage node. As illustrated in FIG. 3B, for example, LSOM 360A-C are instantiated at storage nodes 210A-C, respectively, to perform data operations with respect to data components 312A-C respectively. For example, LSOM 360A-C can provide read and write buffering, data encryption, I/O operations with respect to the respective data components or subcomponents, or the like.

As described above with reference to FIG. 3B, in some embodiments, an entire data component can be stored in a single storage node. For example, the entire data component 312A can be stored in storage node 210A; the entire data component 312B can be stored in storage node 210B; and the entire data component 312C can be stored in storage node 210C; and so forth. In some embodiments, in vSAN 200, dynamic partitioning techniques can be implemented such that a single data component can be distributed to multiple storage nodes while still complying with data storage policies associated with the data component.

Figure 3C:
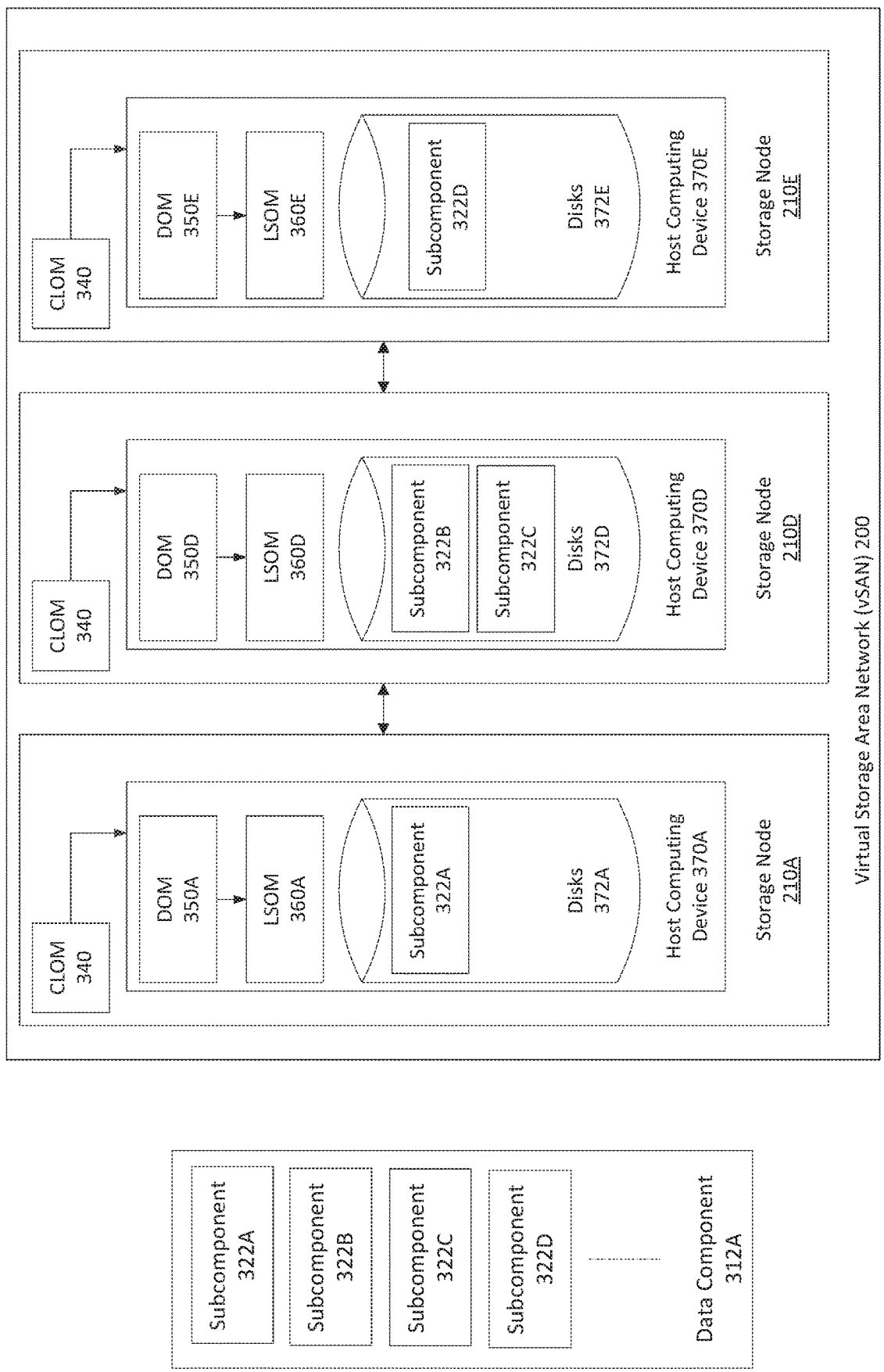
FIG. 3C is a block diagram illustrating a vSAN storing one or more subcomponents of a data component in different storage nodes, in accordance with some embodiments.

FIG. 3C is a block diagram illustrating a vSAN 200 storing one or more subcomponents of a data component 312A in different storage nodes, in accordance with some embodiments of the dynamic partitioning techniques. With reference to FIG. 3C, a data component 312A can include multiple subcomponents (e.g., subcomponents 322A-D). As described above, a data component 312A can have any data size (e.g., 128 Gb, 200 Gb, 256 Gb, etc.). Depending on the storage capacity of a particular storage node, storing the entire data component 312A on the storage node may or may not be practical or possible. Further, it may not be desirable to store the entire data component 312A on a particular storage node even if the capacity of the particular storage node is greater than the data size of data component 312A. For example, if the entire data component 312A is stored on a single storage node, all I/O operations associated with data component 312A may then be performed with respect to the particular storage node. This may cause network bandwidth issues and/or load balancing issues because a particular storage node would be required to process a significant amount of data operations while other storage nodes may not be as busy. Thus, in some embodiments, it is desirable or may be required by data storage policies to distribute the data component to multiple storage nodes.

As illustrated in FIG. 3C, in some embodiments, a DOM (e.g., DOM 350A) can divide, at the data object level, data component 312A to a plurality of subcomponents including subcomponents 322A-322D. For example, DOM 350A can divide the address space representing data component 312A into a plurality of subspaces corresponding to the subcomponents 322A-D. Each of subcomponent 322A-322D can have the same or different data size (e.g., each has a data size of 4 Mb). DOM 350A can then instruct an LSOM operating on the same storage node (e.g., LSOM 360A) to store subcomponent 322A in storage node 210A. DOM 350A can further communicate with DOM 350B to store (via LSOM 360B) subcomponents 322B and 322C in storage node 210D. DOM 350A can further communicate with DOM 350C to store (via LSOM 360C) subcomponents 322D in storage node 210E, and so forth.

As a result, the entire data component 312A does not need to be stored on a single storage node 210A, but can be distributed to multiple storage nodes including nodes 210A, 210D, and 210E. This removes the limitation of data size of a data component due to the storage capacity of any particular storage node. Thus, a data component of any data size can be stored in a distributed manner in a virtual storage area network. This improves the data storage flexibility and efficiency. Further, because the data component is distributed to multiple storage nodes, I/O operations are also distributed and performed at multiple storage nodes. For example, I/O operations with respect to subcomponent 322A are performed on storage node 210A. I/O operations with respect to subcomponents 322B and 322C are performed on storage node 210D. I/O operations with respect to subcomponent 322D are performed on storage node 210E. Distributing operations to multiple storage nodes improves effective utilization of computing resources such as data migration bandwidth. Distributing operations to multiple storage nodes further improves load balancing so that a particular storage node would not be overloaded with a significant amount of data operations while other storage nodes may not be as busy. As a result, the overall operational efficiency of vSAN 200 can be improved.

Figure 3D:
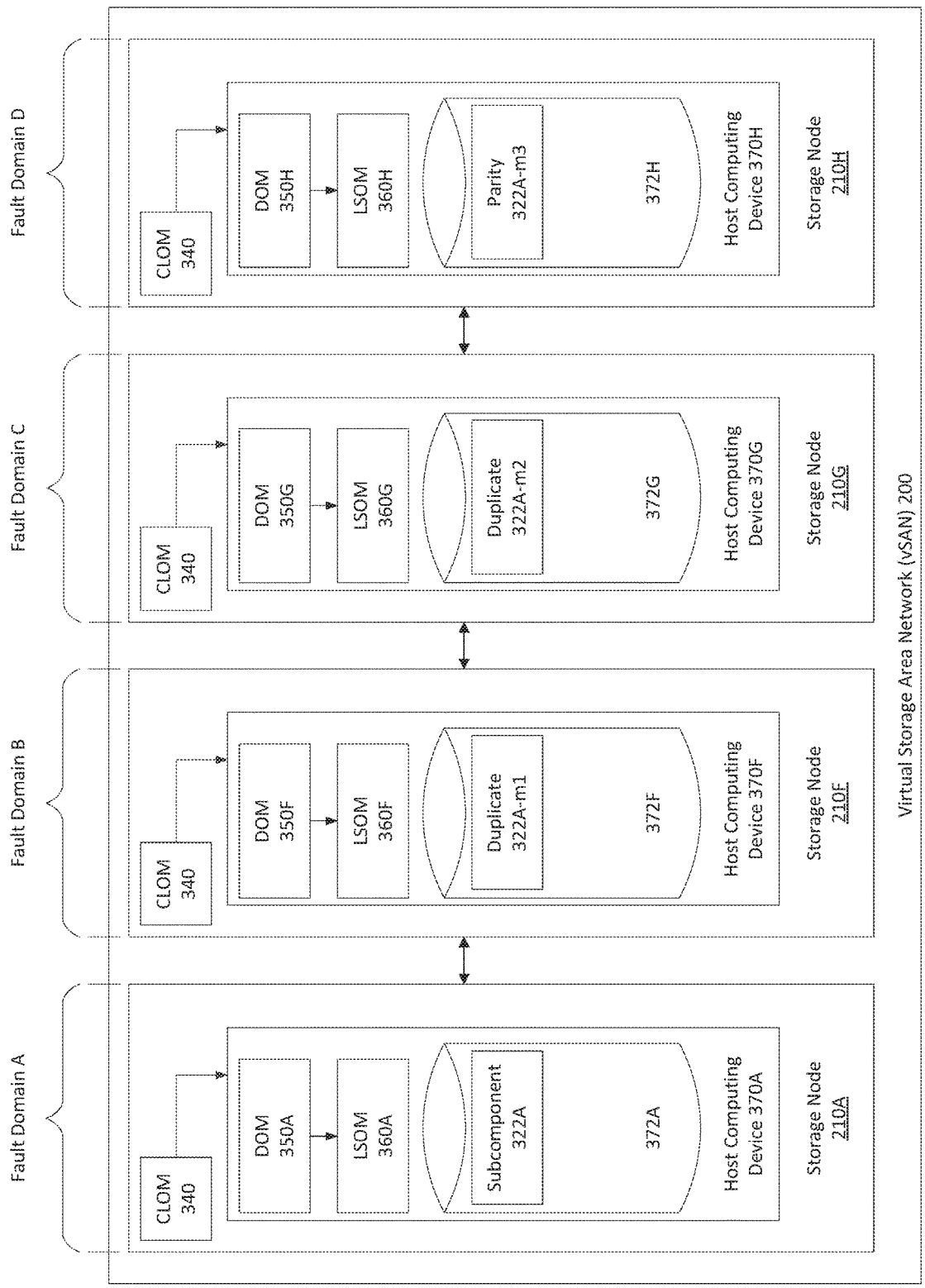
FIG. 3D is a block diagram illustrating a vSAN storing a subcomponent of a data component and duplicates of the subcomponent in different storage nodes for compliance with data storage policies, in accordance with some embodiments.

In some embodiments, the distribution of a data component to a plurality of storage nodes can further be performed in compliance with data storage policies. FIG. 3D is a block diagram illustrating a vSAN 200 storing a subcomponent 322A of a data component 312 and duplicates of the subcomponent in different storage nodes for complying with data storage policies. Storing multiple subcomponents of a same data component in multiple storage nodes while in compliance with a pre-configured data storage policy (e.g., a fault tolerance policy) is enabled by dynamic partitioning techniques using one or more object managers (e.g., DOMs 350A, F, G, and H shown in FIG. 3D) of vSAN 200. With reference to FIG. 3D, for example, a cluster of storage nodes in vSAN 200 may include storage nodes 210A, 210F, 210G, and 210H. As described above with respect to FIG. 3C, a data component 312A can be divided to multiple subcomponents including, for example, subcomponents 322A-D. Subcomponents 322A-D can be stored in a plurality of storage nodes. In some embodiments, a DOM (e.g., DOM 350A) can obtain a fault tolerance policy from CLOM 340. The fault tolerance policy may require that data component 312A (including its subcomponents 322A-D) be stored with data redundancies. For example, the fault tolerance policy may be a RAID 1 policy, which requires a subcomponent and a duplicate of the subcomponent be stored in 2 different fault domains. As another example, the fault tolerance policy may be a RAID 5 policy, which requires a subcomponent and a parity of the subcomponent be stored in 2 different fault domains.

With reference to FIG. 3D, according to the fault tolerance policy provided by CLOM 340, DOM 350A communicates with other DOMs to store one or more duplicates and/or parity of each subcomponent in different fault domains. A fault domain can represent a group of hardware components that share a single point of failure. For example, as illustrated in FIG. 3D, each of storage nodes 210A, 210F, 210G, and 210H can correspond to a respective fault domain A, B, C, and D. A failure in one of the fault domains does not affect the data integrity in another fault domain. As a result, data redundancy is provided and data loss is prevented or reduced.

As shown in FIG. 3D, using subcomponent 322A of data component 312 as an example, based on a fault tolerance policy, DOM 350A communicates with LSOM 360A to store subcomponent 322A in storage node 210A. DOM 350A communicates with DOM 350F/G/H to store (via LSOMs 360F/G/H, respectively) one or more duplicates and/or parity of subcomponent 322A (e.g., one or more duplicates 322A-m1 and 322A-m2, and parity 322A-m3) in storage nodes 210F, 210G, o 210H. In some embodiments, if data is altered (e.g., removed, added, edited, etc.) with respect to subcomponent 322A or with respect to any of the duplicates of subcomponent 322A, one or more DOMs (e.g., DOMs 350A/F/G/H) can perform data synchronization (e.g., via LSOMs 360A/F/G/H respectively) across all duplicates and parity of subcomponent 322A. While FIG. 3D illustrates storing only one subcomponent (i.e., subcomponent 322A) in compliance with a data storage policy, it is appreciated that a DOM can store any number of subcomponents of a data component in compliance with a data storage policy (e.g., a fault tolerance policy provided by CLOM 340). For example, DOM 350A can store (via LSOM 360A) a group of subcomponents of a data component in storage node 210A associated with fault domain A. DOM 350A can further instruct DOM 350F/G/H to store (via LSOMs 360A/F/G/H, respectively) duplicates and parities of the same group of subcomponents of the same data component in storage nodes 210F/G/H, respectively.

As described above, to comply with data storage policies, duplicates or mirrored copies of subcomponents of a data component can be stored in multiple storage nodes. Depending on the data size and the data storage policy, storing multiple duplicates may require significant disk spaces. In some embodiments, to save disk spaces and store data more efficiently, an LSOM (e.g., LSOM 360A) operating in a storage node (e.g., node 210A) can perform data deduplication with respect to one or more subcomponents stored in the same storage node. This type of data deduplication is sometimes also referred to as a node-local data deduplication. Data deduplication removes the redundancy of data within a storage node by determining one or more data structures (e.g., hash maps) of one or more subcomponents stored in the storage node.

Figure 3E:
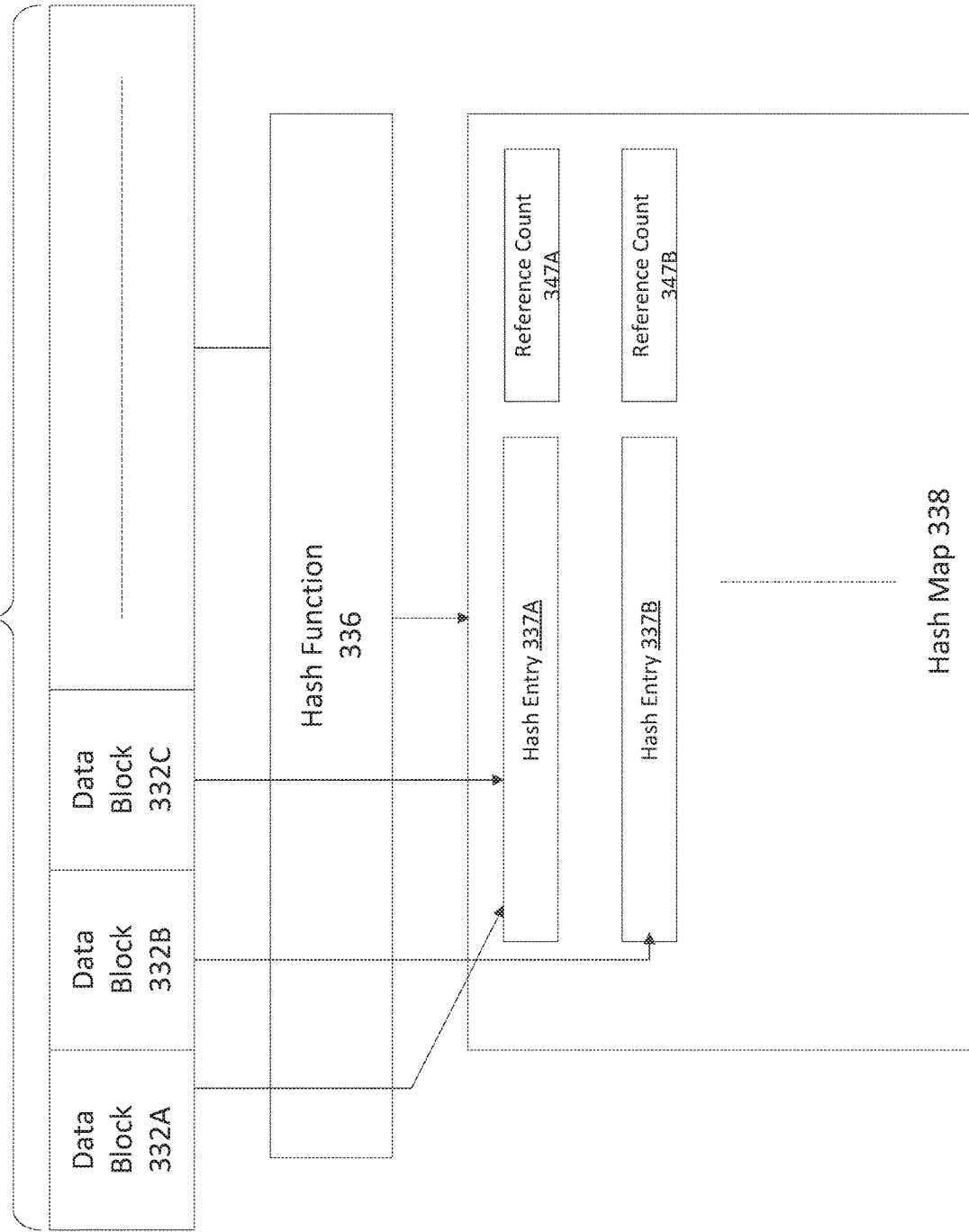
FIG. 3E is a block diagram illustrating generating a data structure of a subcomponent, in accordance with some embodiments.

FIG. 3E is a block diagram illustrating the generation of a data structure (e.g., hash map 338) of a subcomponent 322A, in accordance with some embodiments. As described above, in some embodiments, a subcomponent can include multiple data blocks having the same size or different data sizes. With reference to FIGS. 3D and 3E, a subcomponent 322A can have a data size of, for example, 4 Mb. DOM 350A and/or LSOM 360A can divide subcomponent 322A to multiple data blocks 332A, 332B, 332C, and so forth (collectively as data blocks 332). Each of the data blocks 332 can have a data size of, for example, 4 Kb. As illustrated in FIG. 3E, DOM 350A and/or LSOM 360A can generate or obtain a hash map 338 associated with subcomponent 322A.

With reference to FIG. 3E, in some embodiments, for each of data blocks 332 of subcomponent 322A, a hash function 336 can be applied to generate a hash entry 337 (e.g., 337A and 337B) in hash map 338 representing subcomponent 322A. Hash function 336 can include any hash algorithm (e.g., secure hash algorithm—SHA or SHA2) that maps a data block of any data size to hash values, hashes, or indexes. Hash entries 337, as illustrated in FIG. 3E, can thus include hash values, hashes, indexes. In some embodiments, hash entries 337 in hash map 338 can be used to determine duplicate, common, or substantially similar data blocks. For example, a particular data block may contain data that is duplicate, common, or substantially similar to another data block. Hash entries of the data blocks can be generated by applying hash function 336 to the data blocks. The generated hash entries can be compared to one another. Based on the comparison results, if a hash entry of the particular data block already exists in hash map 338, it indicates that the corresponding data block contains duplicate, common, or substantially similar data as another data block. In some embodiments, metadata (e.g., a reference count) associated with the hash entries are updated based on the comparison results.

Using the example as illustrated in FIG. 3E, data blocks 332A and 332B may contain different data; while data blocks 332A and 332C may contain same or common data. LSOM 360A can apply hash function 336 to data blocks 332A and 332B to determine hash entries 337A and 337B. LSOM 360A compares hash entry 337B to hash entry 337A. LSOM 360A determines that hash entry 337B is different from hash entry 337A. LSOM 360A also applies hash function 336 to data block 332C and determines a hash entry of data block 332C (not shown). LSOM 360A compares the hash entry of data block 332C with existing hash entries 337A and 337B; and determines, for example, that hash entry of data block 332C is the same as hash entry 337A. As a result, LSOM 360A can increase the reference count 347A to indicate that hash entry 337A in this example corresponds to two data blocks 332A and 332C that contain the same or common data.

In some embodiments, a data block that contains the same or common data of another data block may not be stored physically in the storage node or may be physically removed from the storage node. For example, in the above example, data block 332C may not be stored physically in the storage node or may be removed from the storage node, because it contains the same or common data as data block 332A. The above described process of removing duplicate data blocks or storing only unique data blocks in a particular storage node is sometimes referred to as data deduplication. Data deduplication techniques can improve storage utilization and can also be applied to network data migrations to reduce the number of bytes that must be moved (e.g., transferred across storage nodes in a load balancing operation). As described above, in the data deduplication process, unique data blocks (or data patterns) are identified (e.g., using hash maps) and stored in a storage node. It is appreciated that this data deduplication process can be repeated each time new data blocks are received and required to be stored. The data deduplication techniques eliminate the physical storing of redundant data blocks, instead maintaining a reference that points to the stored unique data blocks. A reference count (e.g., reference count 347) for each unique data block is also maintained and dynamically updated to indicate the total number of duplicate data blocks for the particular unique data block. In some embodiments, the same data blocks (or data patterns) may occur dozens, hundreds, or even thousands of times (the match frequency is dependent on the data size of the data block). Thus, data deduplication techniques can reduce the amount of data that must be stored or migrated.

FIGS. 4A-4D illustrate redistribution of data in vSAN 200 based on the dynamic partitioning techniques and the data deduplication techniques described above. Dynamic partitioning techniques, as illustrated above using FIGS. 3C and 3D, enable multiple subcomponents of a same data component to be stored in multiple storage nodes, while still in compliance with data storage policies (e.g., fault tolerance policies). Data deduplication techniques, as illustrated above using FIGS. 3D and 3E, eliminate or reduce the storing of redundant data blocks in a same storage node and thereby greatly reduce the number of unique data blocks that must be stored or transferred. Using these two techniques, data redistribution (e.g., load balancing operations or resynchronization operations) can be performed efficiently to reduce the requirements for computing resources (e.g., CPU power) and network bandwidth. Each of FIGS. 4A-4D is described next in detail.

Figure 4A:
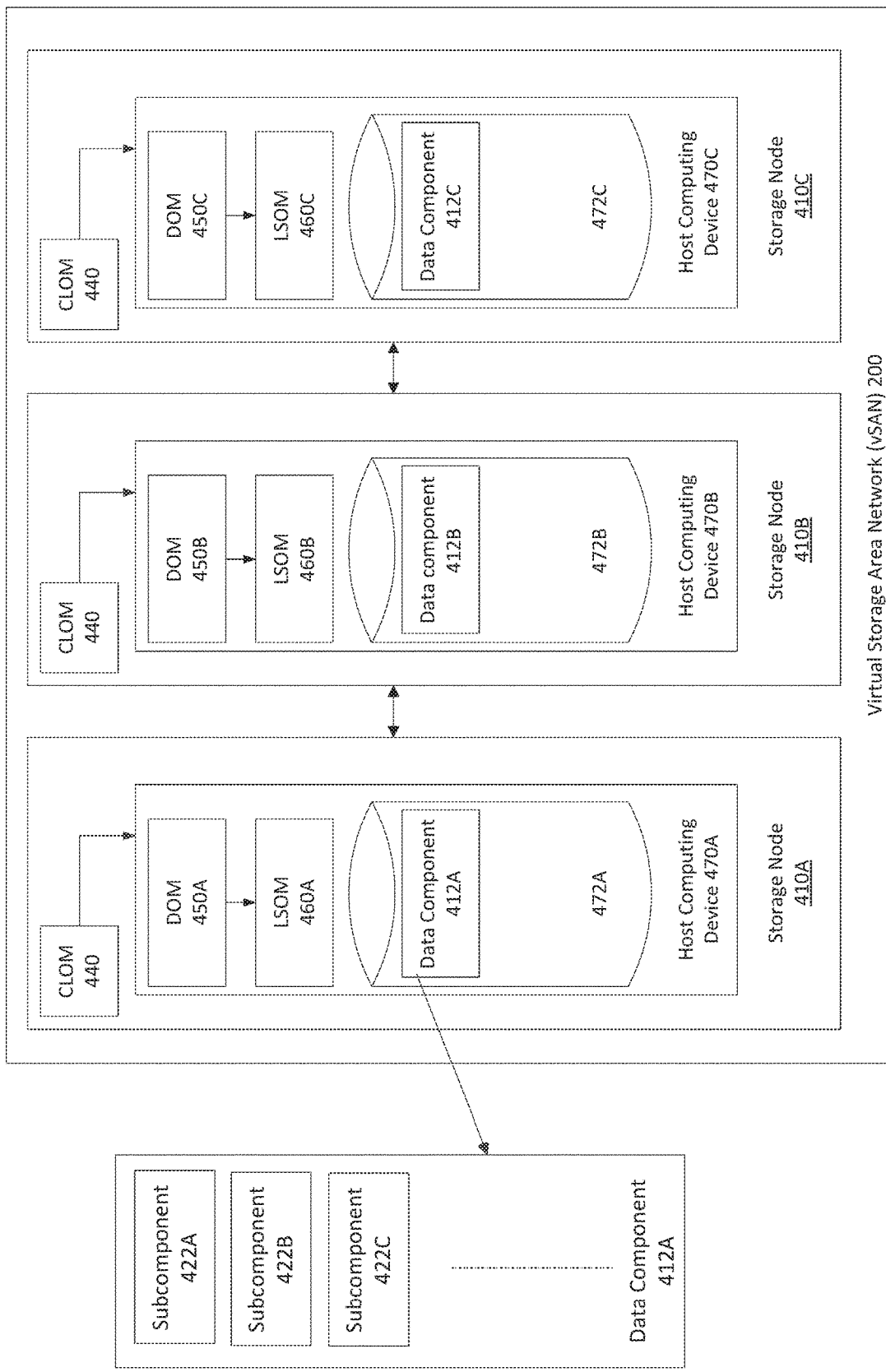
FIG. 4A is a block diagram illustrating multiple subcomponents of a data component stored in a storage node, in accordance with some embodiments.

FIG. 4A is a block diagram illustrating multiple subcomponents of a data component stored in a storage node, in accordance with some embodiments. With reference to FIG. 4A, in some embodiments, a cluster of nodes in vSAN 200 can include storage nodes 410A-C. The object managers (e.g., CLOM 440, DOMs 450A-D, and LSOMs 460A-D) can store, for example, data components 412A-C in storage nodes 410A-C, respectively. Data components 412A-C can each include multiple subcomponents. For example, data component 412A can include subcomponents 422A-C. While FIG. 4A illustrates that a data component is stored in a single storage node, it should be appreciated that using the dynamic partitioning techniques described above, the subcomponents of a data component 412 can be distributed and stored in multiple storage nodes in the cluster. For simplicity of demonstration, however, FIGS. 4A-4D illustrate a data component being stored in a single storage node (e.g., data component 412A stored in storage node 410A).

Figure 4B:
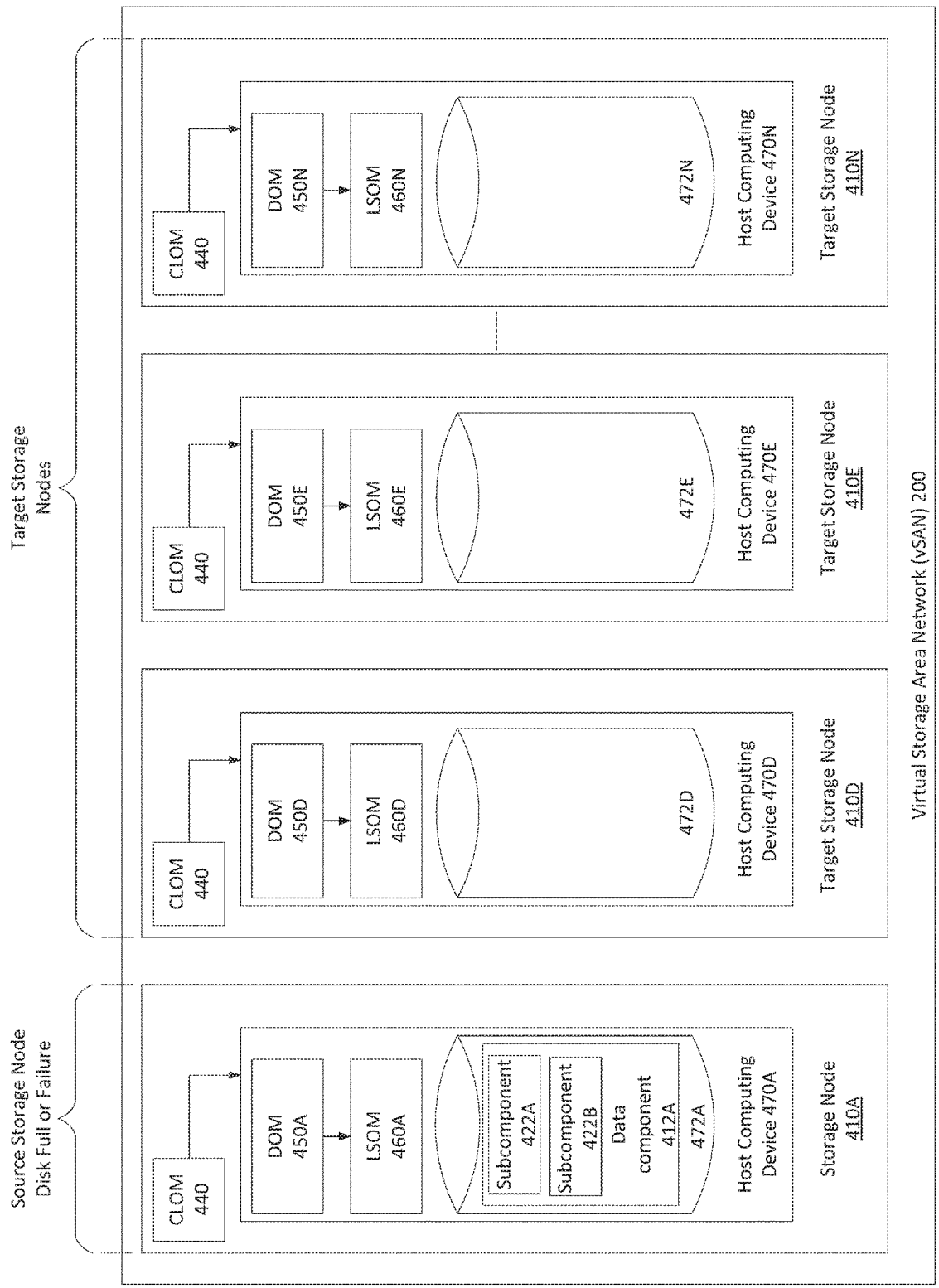
FIG. 4B is a block diagram illustrating identifying a set of target storage nodes based on a triggering event for redistributing one or more subcomponents of a data component, in accordance with some embodiments.

FIG. 4B is a block diagram illustrating identifying a set of target storage nodes based on a triggering event for redistributing one or more subcomponents of a data component, in accordance with some embodiments. With reference to FIG. 4B, in some embodiments, CLOM 440 can identify, within a data component 412A, one or more subcomponents to be redistributed. In some embodiments, the identification can be based on the status of storage node 410A. For example, LSOM 460A monitors the status of storage node 410A. The status of storage node 410A may include, for example, utilization or operational statuses of storage node 410A. The utilization of storage node 410A can indicate the percentage of the capacity of storage node 410A that has been used for storing data (e.g., the disks in storage node 410A are 50% full). The operational status of storage node 410A can indicate the system performance (e.g., whether one or more systems or devices of storage node 410A have failed or are not performing as expected) and the workload (e.g., 40% of the CPU power or bandwidth is being used for storing/transferring data) of storage node 410A. LSOM 460A can report the status of storage node 410A to DOM 450A and/or CLOM 440. Similar, other LSOMs can report the statuses of other storage nodes in the cluster to other DOMs 450 and CLOM 440. As described above, CLOM 440 can manage data storage and operations for all storage nodes 410 in a cluster. Based on one or more of the statuses of storage nodes 410, CLOM 440 can identify, within a data component, one or more subcomponents to be redistributed.

As an example illustrated in FIG. 4B, based on the status of storage node 410A (and optionally, statuses of other nodes), CLOM 440 can detect a data redistribution triggering event. For example, the status of storage node 410A may indicate that the utilization of disks of storage nodes is high (e.g., about 90% full) and/or that there has been a disk failure associated with one or more physical disks of storage node 410A. Further, similar to those described above, CLOM 440 can determine and store data storage policies. Data storage policies can include, for example, a data redistribution or resynchronization policy, which may define the conditions or events for triggering data redistribution or resynchronization operations. In some embodiments, based on the status of storage node 410A and data redistribution or resynchronization policy, CLOM 440 can detect (e.g., via DOM 450A and LSOM 460A) one or more data redistribution triggering events. As an example, CLOM 440 may determine that the data size of data component 412 (and/or other data components) stored in storage node 410A is greater than a threshold capacity provided by the data redistribution or resynchronization policy. As another example, CLOM 440 may determine that one or more disks of storage node 410A have failed and thus storage node 410A is a failed storage node.

In response to detecting one or more data redistribution triggering events (e.g., disk failure or high utilization), CLOM 440 can identify, within data component 412A, one or more subcomponents to be redistributed. For illustration purpose, FIG. 4B only shows that two subcomponents 422A and 422B of data component 412A are identified to be redistributed. It is appreciated that any number of subcomponents can be identified to be redistributed. For example, if storage node 410A is a failed storage node, CLOM 440 may identify all subcomponents stored on node 410A to be redistributed. As another example, if the data size of the data stored in node 410A is greater than a threshold capacity (e.g., 80%), CLOM 440 may identify some but not all subcomponents to be redistributed.

With reference to FIG. 4B, in some embodiments, for redistributing data, CLOM 440 can identify a set of target storage nodes. Target storage nodes are capable of receiving the redistributed data (e.g., subcomponents 422A and 422B), but may or may not actually receive the redistributed data. As described below, one or more destination storage nodes are determined from the set of target storage nodes for actually receiving the redistributed data. In some embodiments, target storage nodes can be all storage nodes in a cluster except the source storage nodes that store the data to be redistributed.

As shown in FIG. 4B, in some embodiments, CLOM 440 can identify a set of target storage nodes based on at least one of the data storage policies and statuses of the one or more storage nodes associated with the cluster of storage nodes. As described above, data storage policies may include a fault tolerance policy that requires duplicates of a data component or subcomponents to be stored in different storage nodes associated with different fault domains for providing data redundancy. Thus, to comply with a fault tolerance policy, a data component or subcomponents may not be redistributed to those storage nodes storing the duplicates of the same data component or subcomponents, because such redistribution may violate the fault tolerance policy. Accordingly, in some embodiments, for each data component or subcomponent to be redistributed, CLOM 440 can identify target storage nodes as those storage nodes to which redistribution of the data does not violate the fault tolerance policy. For example, for a particular data component or subcomponent to be redistributed, CLOM 440 can identify a set of target storage nodes that are associated with fault domains different from one or more fault domains of one or more storage nodes that store duplicates or parities of the same data component or subcomponent.

In some embodiments, the identification of target storage nodes can be based on statuses of the one or more storage nodes in the cluster. For example, storage nodes that are already highly utilized (e.g., 80% full) and/or that have disk failures may not be identified as target storage nodes. In some embodiments, CLOM 440 can make such identification based on data storage policies that define the target storage node identification criteria.

As illustrated in FIG. 4B, for example, CLOM 440 can identify storage nodes 410D, 410E, . . . and 410N to be target storage nodes. Among these identified target storage nodes, one or more destination storage nodes can be determined for redistributing subcomponents 422A and 422B. To make such a determination, in some embodiments, DOM 450A can obtain data structures of subcomponents 422A and 422B that are to be redistributed. The data structures can include, for example, hash maps, hash tables, or any data structures that provide mapping from physical data blocks to references or values for detecting duplicate or common data blocks. As described above with respect to FIG. 3E, a hash map can be determined for a subcomponent including multiple data blocks. Thus, in FIG. 4B, LSOM 460A can determine a first hash map for subcomponent 422A and a second hash map for subcomponent 422B. Each of the subcomponents 422A and 422B includes multiple data blocks, and each of the first and second hash maps includes a plurality of hash entries representing the multiple data blocks in respective subcomponents 422A and 422B. As described above, the data size of the data blocks can be configurable (e.g., 4 Kb, 16 Kb, 64 Kb) and therefore, for a particular subcomponent (e.g., a 4 Mb subcomponent), the number of data blocks included in the subcomponent can vary. Accordingly, the number of hash entries in a hash map can also vary based on the number of data blocks.

Figure 4C:
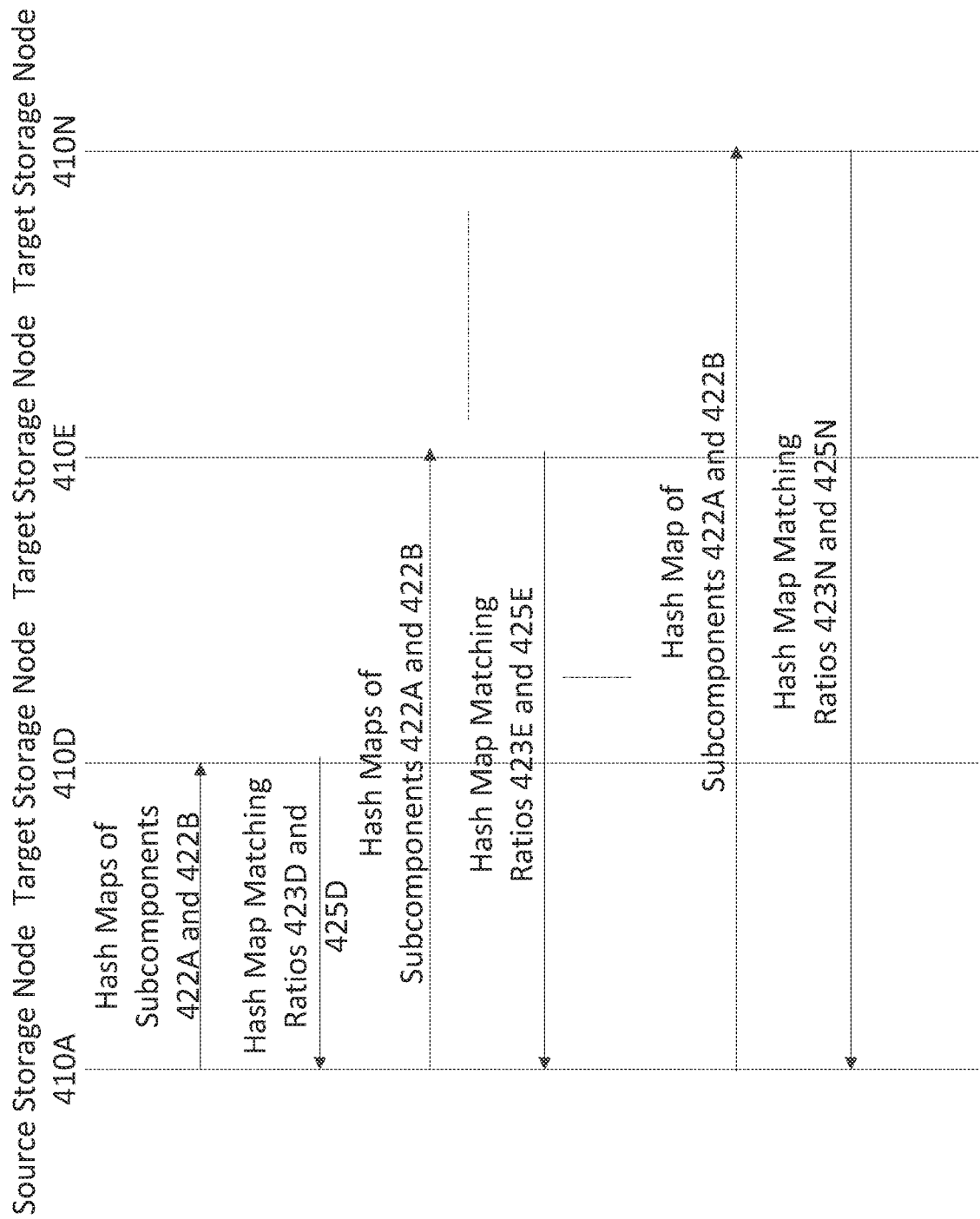
FIG. 4C is a communication flow diagram illustrating multicasting of hash maps of subcomponents from a source storage node to one or more target storage nodes, in accordance with some embodiments.

Based on the data structures (e.g., hash maps) of the subcomponents to be redistributed, DOM 450A can determine, among the set of target storage nodes, one or more destination storage nodes for redistributing the subcomponents. With reference to FIGS. 4B and 4C, for redistributing subcomponents 422A and 422B, for example, DOM 450A can obtain the hash maps of subcomponents 422A and 422B from LSOM 460A. DOM 450A can provide the hash maps of subcomponents 422A and 422B to some or all target storage nodes 410D, 410E, . . . and 410N. After receiving the hash maps of subcomponents 422A and 422B, some or all of the target storage nodes 410D, 410E, . . . and 410N can determine one or more data structure matching ratios for each of the subcomponents 422A and 422B.

For example, as shown in FIG. 4C, target storage node 410D receives the hash map of subcomponent 422A from source storage node 410A. Target storage node 410D can obtain (e.g., using DOM 450D and/or LSOM 460D) hash maps of the subcomponents of all the data components stored in target storage node 410D. Target storage node 410D can then compare the hash map of subcomponent 422A received from source storage node 410A to the hash maps of subcomponents of all the data components stored in target storage node 410D. Based on the comparison results, target storage node 410D can determine a data structure matching ratio, which is the ratio of the number of the matching data blocks included in subcomponent 422A to the total number of data blocks in subcomponent 422A. In some embodiments, a data structure matching ratio is also referred to as a hash map matching ratio or a hash map hit ratio. The matching data blocks included in subcomponent 422A are those having the same hash entries (e.g., hash values) or references as the data blocks included in the subcomponents stored in target storage node 410D. A same hash entry or reference indicates that two or more data blocks share the same or common data. Thus, hash map matching ratio 423D represents the data deduplication level with respect to subcomponent 422A at target storage node 410D. If hash map matching ratio 423D is high (e.g., 80%), it indicates that target storage node 410D already stores a large number of data blocks that share the same or common data as those data blocks included in subcomponent 422A to be redistributed.

Similarly, based on the hash map of subcomponent 422B, target storage node 410D can determine the hash map matching ratio 425D, representing the data deduplication level with respect to subcomponent 422B at target storage node 410D. In some embodiments, target storage node 410D can provide (e.g., using DOM 450D) the hash map matching ratios 423D and 425D back to source storage node 410A. Similarly, as illustrated in FIG. 4C, based on received hash maps of subcomponents 422A and 422B, target storage nodes 410E can determine hash map matching ratios 423E and 425E, representing the data deduplication level with respect to subcomponents 422A and 422B, respectively, at target storage node 410E. Target storage nodes 410E can provide the hash map matching ratios 423E and 425E back to source storage node 410A. It is appreciated that a source storage node can provide hash maps of any number of subcomponents to be redistributed to any number of target storage nodes (e.g., perform a multicast), each of which can then determine a hash map matching ratio with respect to each of the subcomponent to be redistributed. All the hash map matching ratios can then be provided back to the source storage node from the target storage nodes.

Figure 4D:
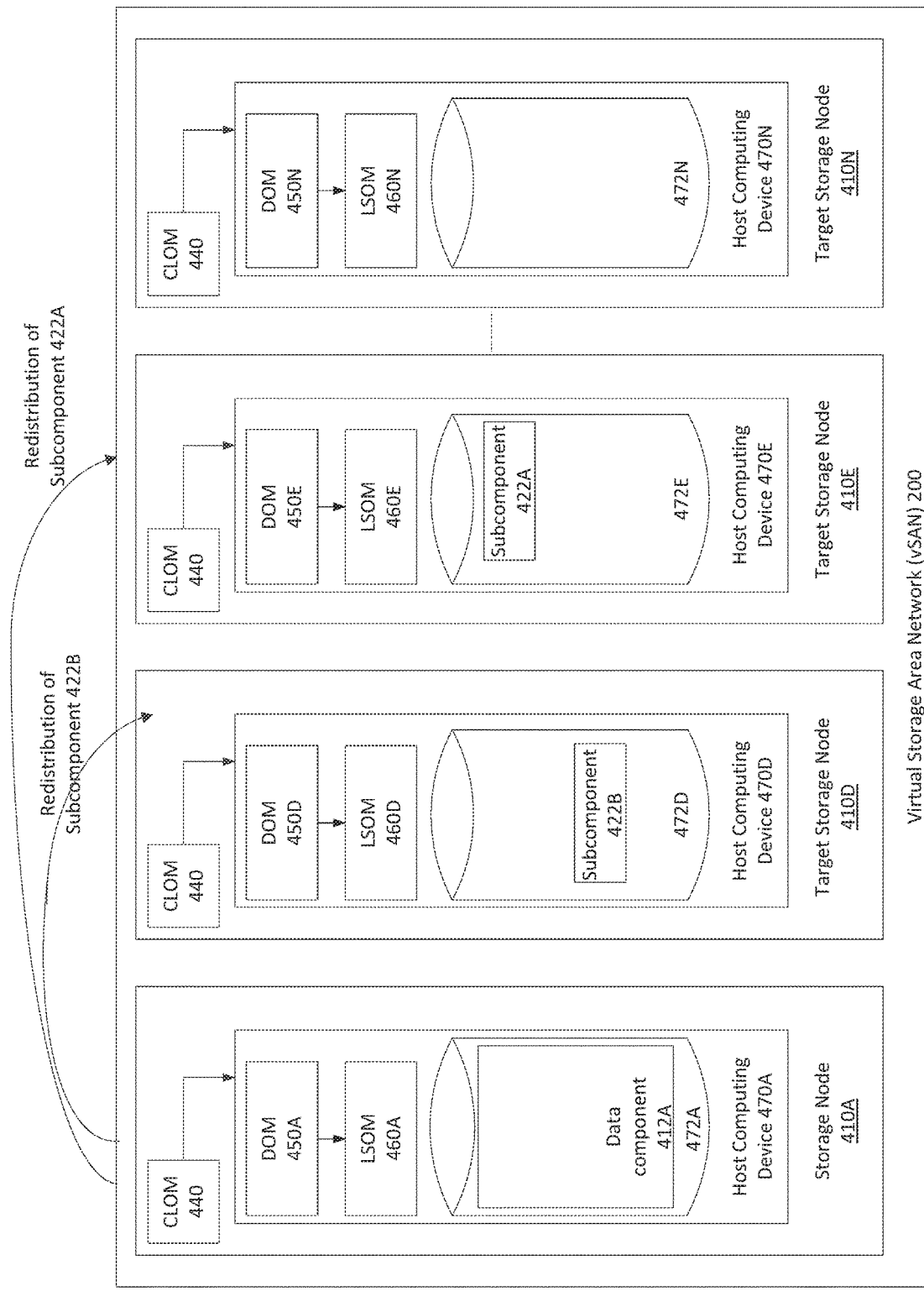
FIG. 4D is a block diagram illustrating redistribution of subcomponents from a source storage node to destination storage nodes selected from multiple target storage nodes, in accordance with some embodiments.

With reference to FIG. 4C, with respect to subcomponent 422A to be redistributed, source storage node 410A receives hash map matching ratios 423D, 423E, . . . 423N, representing the data deduplication levels for subcomponent 422A at target storage nodes 410D, 410E, . . . 410N. Similarly, with respect to subcomponent 422B to be redistributed, source storage node 410A receives hash map matching ratios 425D, 425E, . . . 425N, representing the data deduplication levels for subcomponent 422B at target storage nodes 410D, 410E, . . . 410N. Based on these hash map matching ratios, source storage node 410A can determine, for each of subcomponents 422A and 422B to be redistributed, a highest hash map matching ratio. Based on the highest hash map matching ratios, source storage node 410A can determine a destination storage node for each subcomponent to be redistributed. For example, as illustrated in FIG. 4D, with respect to subcomponent 422A, source storage node 410A may determine (e.g., via DOM 450A) that the highest hash map matching ratio is 60%, which is a ratio provided by target storage node 410E. Similarly, with respect to subcomponent 422B, source storage node 410A may determine (e.g., via DOM 450A) that the highest hash map matching ratio is 70%, which is a ratio provided by target storage node 410D.

Based on the determinations of the highest data structure mapping ratios and the corresponding target storage nodes, source storage node 410A can determine (e.g., via DOM 450A) a destination storage node for each subcomponent. As illustrated in FIG. 4D, for example, source storage node 410A determines that the target storage node 410D is the destination storage node for subcomponent 422B and determines that the target storage node 410E is the destination storage node for subcomponent 422A.

With reference to FIG. 4D, in some embodiments, based on the determined destination storage nodes, source storage node 410A can redistribute subcomponents 422A and 422B to the destination storage nodes. For example, source storage node 410A can migrate (e.g., physically move) subcomponent 422A to target storage node 410E (the destination storage node for subcomponent 422A). Likewise, source storage node 410A can migrate (e.g., physically move subcomponent 422B to target storage node 410D (the destination storage node for subcomponent 422B). In some embodiments, only a portion of data blocks of a subcomponent are migrated from a source storage node to a destination storage node. For example, data blocks that already exist in a destination storage node may not be physically moved. Instead, only unique data blocks are moved. By redistributing a particular subcomponent as described above, subcomponents of a data component are migrated after determining a destination storage node that has the highest data deduplication level for a particular subcomponent. The determination of the destination storage node uses data structures such as hash maps, the size of which is significantly less than the size of the corresponding subcomponents of a data component. As a result, the redistribution of the data described in this application greatly reduces bandwidth and computing resources requirements for data migration operations such as repairing and rebalancing.

Moreover, instead of redistributing all subcomponents of a data component from a source storage node to a single destination storage node, the redistribution techniques described above can redistribute different subcomponents of a data component to different storage nodes, depending on the data deduplication level at each destination storage nodes. The techniques also improve the utilization of storage spaces by transferring data to a node that has the highest data deduplication level. Moreover, because data are redistributed to multiple storage nodes, load balancing is also enhanced by the techniques described above.

Further, the data redistribution as described above can also be performed in compliance with data storage policies. For example, as described above, the target storage nodes can be selected in such a way that they do not include duplicates or mirrors of the data components/subcomponents for the purpose of complying with fault tolerance policies. Therefore, transferring data to one or more of the target storage nodes still can comply with the fault tolerance policies.

FIG. 5A illustrates a flowchart of exemplary processes 500 for redistributing a virtual storage area network (vSAN) data component in a distributed-computing system, in accordance with some embodiments. Process 500 is performed, for example, at one or more storage nodes of a cluster of storage nodes operating in the cloud-computing environment. In some embodiments, the distributed-computing system comprises a plurality of storage nodes or host computing devices (e.g., host computing device 100 described in reference to FIG. 1A) that are communicatively coupled together in a vSAN. In some embodiments, the distributed-computing system is implemented by one or more virtual machines (e.g., VM 102 described in reference to FIGS. 1A-1B). The distributed-computing system implements, for example, object managers (e.g., CLOM, DOM, LSOM) and persisting storages (e.g., corresponding disks in FIG. 3B). In some embodiments, the operations of process 500 are distributed across the various systems (e.g., storage nodes) of the distributed-computing system. In process 500, some blocks are, optionally, combined, the order of some blocks is, optionally, changed, and some blocks are, optionally, omitted. In some embodiments, additional operations may be performed in combination with process 500.

At block 502, in accordance with a data storage policy, a data component is stored in a plurality of storage nodes (e.g., storage nodes 210A, 210D, and 210E shown in FIG. 3C) associated with the cluster of storage nodes.

At block 504, within the data component, one or more subcomponents (e.g., subcomponents 422A and 422B) to be redistributed are identified. The one or more subcomponents are stored in one or more source storage nodes (e.g., storage node 410A).

At block 506, a set of target storage nodes is identified among the cluster of storage nodes operating in the distributed-computing system (e.g., target storage nodes 410D, 410E, . . . 410N).

At block 508, one or more data structures (e.g., hash maps as shown in FIG. 4C) representing the one or more subcomponents to be redistributed are obtained.

At block 510, one or more destination storage nodes (e.g., storage nodes 410D and 410E) are determined among the set of target storage nodes based on the one or more data structures representing the one or more subcomponents to be redistributed.

At block 512, in accordance with the data storage policy, the one or more subcomponents (e.g., subcomponents 422B and 422C) are redistributed from the one or more source storage nodes to the one or more destination storage nodes.

Figure 5B:
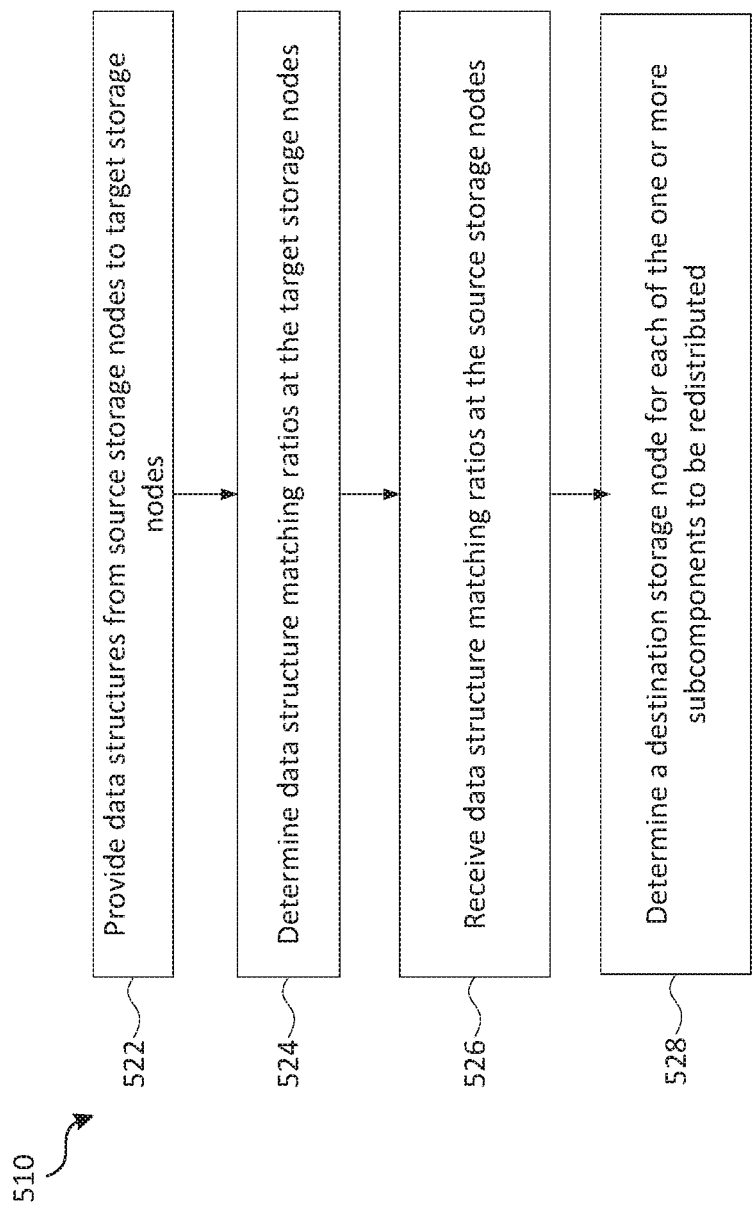

FIG. 5B illustrates a flowchart of exemplary process 510 for determining a destination storage node. Process 510 can be performed by a DOM of a storage node. With reference to FIG. 5B, at block 522, one or more data structures representing one or more subcomponents to be redistributed are provided from one or more source storage nodes to a set of target storage nodes.

At block 524, based on the one or more data structures representing the one or more subcomponents to be redistributed, one or more data structure matching ratios associated with each of the set of target storage nodes are determined. The determination is performed at each of the target storage nodes.

At block 526, the one or more data structure matching ratios associated with each of the set of target storage nodes are received at the one or more source storage nodes from the target storage nodes.

At block 528, based on the one or more data structure matching ratios associated with each of the set of target storage nodes, a destination storage node for each of the one or more subcomponents to be redistributed is determined.

In accordance with some implementations, a computer-readable storage medium (e.g., a non-transitory computer-readable storage medium) is provided, the computer-readable storage medium storing one or more programs for execution by one or more processors of an electronic device, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for redistributing a virtual storage area network (vSAN) data component in a distributed-computing system, the method comprising:
at one or more storage nodes of a cluster of storage nodes operating in the distributed-computing system, each storage node having one or more processors and memory:
storing, in accordance with a data storage policy, a data component in at least one storage node associated with the cluster of storage nodes;
in response to detecting a data redistribution triggering event associated with a current operational status of a storage node of the plurality of storage nodes identifying, within the data component stored in the storage node, a plurality of subcomponents to be redistributed to one or more other storage nodes of the plurality of storage nodes, wherein identifying the plurality of subcomponents of the data object comprises dividing an address space representing the data component into a plurality of subspaces corresponding to the plurality of subcomponents; and,
in response to identifying the one or more subcomponents to be redistributed:
identifying a set of target storage nodes among the cluster of storage nodes;
obtaining respective data structures representing each of the plurality of subcomponents to be redistributed;
determining, among the set of target storage nodes, one or more destination storage nodes based on the data structures representing the plurality of subcomponents to be redistributed and data structures representing data components stored in each of the set of target storage nodes; and redistributing, in accordance with the data storage policy, the plurality of subcomponents from the storage nodes to the one or more destination storage nodes.

2. The method of claim 1, wherein the storage node of the cluster of storage nodes comprises a host computing device, wherein the host computing device includes one or more virtual machines, and wherein the one or more virtual machines have access to one or more physical disks of the host computing device.

3. The method of claim 1, wherein the data storage policy is a fault tolerance policy.

4. The method of claim 3, wherein at least two storage nodes of the cluster of storage nodes are associated with different fault domains in compliance with the fault tolerance policy.

5. The method of claim 1, wherein storing, in accordance with the data storage policy, the data component in at least one storage node associated with the cluster of storage nodes comprises:
   storing one or more first subcomponents of the data component in the storage node; and
   storing one or more second subcomponents of the data component in a second storage node, wherein each second subcomponent is different from each first subcomponent.

6. The method of claim 5, wherein the data size of the data component is greater than the storage capacity of the first storage node.

7. The method of claim 1, wherein storing, in accordance with the data storage policy, the data component in at least one storage node associated with the cluster of storage nodes comprises storing, in accordance with a fault tolerance policy that requires data redundancy:
   the data component in a first storage node, wherein the first storage node is associated with a first fault domain; and
   one or more duplicates of the data component in one or more additional storage nodes different from the first storage node, wherein the one or more additional storage nodes are associated with one or more fault domains different from the first fault domain.

8. The method of claim 7, wherein the data component of the first storage node is to be redistributed, and wherein at least one storage node of the identified set of target storage nodes is associated with a fault domain that is different from one or more fault domains associated with the first storage node.

9. The method of claim 1,
   wherein detecting the data redistribution triggering event comprises identifying the current operational status of the storage node as having one or more failed storage disks; and
   wherein the plurality of subcomponents to be redistributed from the storage node to the one or more destination storage nodes are stored in the one or more failed storage disks.

10. The method of claim 1,
    wherein detecting the data redistribution triggering event comprises identifying the current operational status of the storage node as having a utilization greater than a threshold capacity.

11. The method of claim 1, wherein identifying the set of target storage nodes comprises:
    obtaining statuses of the storage nodes associated with the cluster of storage nodes; and
    identifying, based on the data storage policy and the obtained statuses of the storage nodes associated with the cluster of storage nodes, a plurality of target storage nodes for redistributing the one or more subcomponents.

12. The method of claim 1, wherein obtaining the one or more data structures representing the plurality of subcomponents to be redistributed comprises, for each subcomponent of the plurality of subcomponents to be redistributed:
    obtaining a hash map of the subcomponent, wherein the hash map includes a plurality of hash entries representing a plurality of data blocks included in the subcomponent.

13. The method of claim 1, wherein determining, among the set of target storage nodes, one or more destination storage nodes based on the one or more data structures representing the plurality of subcomponents to be redistributed comprises:
    providing, from the source storage nodes storage node to the set of target storage nodes, the data structures representing the plurality of subcomponents to be redistributed;
    determining, based on the data structures representing the plurality of subcomponents to be redistributed, one or more data structure matching ratios associated with each of the set of target storage nodes;
    receiving, at the storage node, the one or more data structure matching ratios associated with each of the set of target storage nodes; and
    determining, based on the one or more data structure matching ratios associated with each of the set of target storage nodes, a destination storage node for each subcomponent of the plurality of subcomponents to be redistributed.

14. The method of claim 13, wherein determining, based on the one or more data structure matching ratio associated with each of the set of target storage nodes, a destination storage node for each of the plurality of subcomponents to be redistributed comprises, for each subcomponent of the plurality of subcomponents to be redistributed:
    determining a highest data structure matching ratio; and
    determining the destination storage node that corresponds to the highest data structure matching ratio.

15. The method of claim 13, wherein a data structure matching ratio of the one or more data structure matching ratios represents a ratio of the number of matching data blocks included in a subcomponent of the plurality of subcomponents to be redistributed to the total number of data blocks in the subcomponent of the plurality of subcomponents to be redistributed.

16. The method of claim 13, wherein redistributing, in accordance with the data storage policy, the plurality of subcomponents from the storage node to the one or more destination storage nodes comprises:
    for each subcomponent of the plurality of subcomponents to be redistributed, transmitting the subcomponent from the storage node to a destination storage node having the highest data structure matching ratio associated with the subcomponent.

17. The method of claim 1, wherein redistributing each subcomponent from the storage node comprise redistributing data stored in the address subspace corresponding to the subcomponent to the one or more destination storage nodes.

18. A non-transitory computer-readable storage medium storing one or more programs configured to be executed by one or more storage nodes of a cluster of storage nodes operating in a distributed-computing system, each storage node having one or more processors and memory, the one or more programs including instructions for:
- storing, in accordance with a data storage policy, a data component in at least one storage node associated with the cluster of storage nodes;
- in response to detecting a data redistribution triggering event associated with a current operational status of a storage node of the plurality of storage nodes identifying, within the data component stored in the storage node, a plurality of subcomponents to be redistributed to one or more other storage nodes of the plurality of storage nodes, wherein identifying the plurality of subcomponents of the data object comprises dividing an address space representing the data component into a plurality of subspaces corresponding to the plurality of subcomponents; and
- in response to identifying the one or more subcomponents to be redistributed:
  - identifying a set of target storage nodes;
  - obtaining respective data structures representing each of the plurality of subcomponents to be redistributed;
  - determining, among the set of target storage nodes, one or more destination storage nodes based on the data structures representing the plurality of subcomponents to be redistributed and data structures representing data components stored in each of the set of target storage nodes; and
  - redistributing, in accordance with the data storage policy, the plurality of subcomponents from the storage nodes to the one or more destination storage nodes.

19. The computer-readable storage medium of claim 18, wherein storing, in accordance with the data storage policy, the data component in a plurality of storage nodes associated with the cluster of storage nodes comprises:
- storing one or more first subcomponents of the data component in the storage node; and
- storing one or more second subcomponents of the data component in a second storage node, wherein each second subcomponent is different from each first subcomponent.

20. The computer-readable storage medium of claim 18, wherein determining, among the set of target storage nodes, one or more destination storage nodes based on the one or more data structures representing the plurality of subcomponents to be redistributed comprises:
- providing, from the storage node to the set of target storage nodes, the data structures representing the plurality of subcomponents to be redistributed;
- determining, based on the data structures representing the plurality of subcomponents to be redistributed, one or more data structure matching ratios associated with each of the set of target storage nodes;
- receiving, at the storage node, the one or more data structure matching ratios associated with each of the set of target storage nodes; and
- determining, based on the one or more data structure matching ratios associated with each of the set of target storage nodes, a destination storage node for each subcomponent of the plurality of subcomponents to be redistributed.

21. A system for redistributing a virtual storage area network (vSAN) data component in a distributed-computing system, the system comprising:
- one or more storage nodes of a cluster of storage nodes operating in the distributed-computing system, each storage node having one or more processors and memory storing one or more programs configured to be executed by the one or more processors, the one or more programs including instructions for:
  - storing, in accordance with a data storage policy, a data component in at least one storage node associated with the cluster of storage nodes;
  - in response to detecting a data redistribution triggering event associated with a current operational status of a storage node of the plurality of storage nodes identifying, within the data component stored in the storage node, a plurality of subcomponents to be redistributed to one or more other storage nodes of the plurality of storage nodes, wherein identifying the plurality of subcomponents of the data object comprises dividing an address space representing the data component into a plurality of subspaces corresponding to the plurality of subcomponents; and
  - in response to identifying the one or more subcomponents to be redistributed:
    - identifying a set of target storage nodes;
    - obtaining respective data structures representing each of the plurality of subcomponents to be redistributed;
    - determining, among the set of target storage nodes, one or more destination storage nodes based on the data structures representing the plurality of subcomponents to be redistributed and data structures representing data components stored in each of the set of target storage nodes; and
    - redistributing, in accordance with the data storage policy, the plurality of subcomponents from the storage nodes to the one or more destination storage nodes.

22. The system of claim 21, wherein storing, in accordance with the data storage policy, the data component in at least one storage node associated with the cluster of storage nodes comprises:
- storing one or more first subcomponents of the data component in the storage node; and
- storing one or more second subcomponents a second subcomponent of the data component in a second storage node, wherein each second subcomponent is different from each first subcomponent.

23. The system of claim 21, wherein determining, among the set of target storage nodes, one or more destination storage nodes based on the one or more data structures representing the plurality of subcomponents to be redistributed comprises:
- providing, from the storage node to the set of target storage nodes, the data structures representing the plurality of subcomponents to be redistributed;
- determining, based on the data structures representing the plurality of subcomponents to be redistributed, one or more data structure matching ratios associated with each of the set of target storage nodes;
- receiving, at the storage node, the one or more data structure matching ratios associated with each of the set of target storage nodes; and
- determining, based on the one or more data structure matching ratios associated with each of the set of target storage nodes, a destination storage node for each subcomponent of the plurality of subcomponents to be redistributed.

* * * * *